(12) United States Patent
Zhang et al.

(10) Patent No.: US 11,003,533 B2
(45) Date of Patent: May 11, 2021

(54) DATA PROCESSING METHOD, SYSTEM, AND APPARATUS

(71) Applicant: HUAWEI TECHNOLOGIES CO., LTD., Guangdong (CN)

(72) Inventors: Jiajin Zhang, Shenzhen (CN); Matt M. T. Yiu, Hong Kong (CN); Pak-Ching Lee, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 16/369,102

(22) Filed: Mar. 29, 2019

(65) Prior Publication Data

US 2019/0220356 A1 Jul. 18, 2019

Related U.S. Application Data

(63) Continuation of application No. PCT/CN2017/103678, filed on Sep. 27, 2017.

(30) Foreign Application Priority Data

Sep. 30, 2016 (CN) .......................... 201610875562.X

(51) Int. Cl.
*G11C 29/00* (2006.01)
*G06F 11/10* (2006.01)
(Continued)

(52) U.S. Cl.
CPC ........ *G06F 11/1076* (2013.01); *G06F 3/0619* (2013.01); *G06F 3/0644* (2013.01); *G06F 3/0673* (2013.01); *G06F 12/02* (2013.01)

(58) Field of Classification Search
None
See application file for complete search history.

(56) References Cited

U.S. PATENT DOCUMENTS 9,417,955 B2 *  8/2016  Patterson, III ........ G06F 3/0619
9,432,192 B1 *  8/2016  Pogde ................... H04L 9/0836
(Continued)

FOREIGN PATENT DOCUMENTS

CA         2544063      * 11/2004     ............. G06F 12/16
CN       102752402 A      10/2012
(Continued)

OTHER PUBLICATIONS

Office Action issued in Chinese Application No. 201610875562.X dated Aug. 26, 2019, 6 pages.
(Continued)

*Primary Examiner* — Guerrier Merant
(74) *Attorney, Agent, or Firm* — Fish & Richardson P.C.

(57) ABSTRACT

A data processing method is disclosed, and the method includes: encoding a data chunk of a predetermined size, to generate an error-correcting data chunk corresponding to the data chunk, where the data chunk includes a data object, and the data object includes a key, a value, and metadata; and generating a data chunk index and a data object index, where the data chunk index is used to retrieve the data chunk and the error-correcting data chunk corresponding to the data chunk, the data object index is used to retrieve the data object in the data chunk, and each data object index is used to retrieve a unique data object.

26 Claims, 15 Drawing Sheets

(51) Int. Cl.
*G06F 3/06* (2006.01)
*G06F 12/02* (2006.01)

(56) References Cited

U.S. PATENT DOCUMENTS

| | | | |
|---|---|---|---|
| 9,767,139 B1* | 9/2017 | Bent | G06F 11/14 |
| 10,409,769 B1* | 9/2019 | Malhotra | G06F 3/067 |
| 2005/0028072 A1 | 2/2005 | Murthy | |
| 2009/0300321 A1* | 12/2009 | Balachandran | G06F 12/023 |
| | | | 711/216 |
| 2010/0198849 A1 | 8/2010 | Thomas et al. | |
| 2011/0196829 A1* | 8/2011 | Vickrey | G06F 16/275 |
| | | | 707/622 |
| 2012/0291099 A1* | 11/2012 | Grube | G06F 16/951 |
| | | | 726/3 |
| 2015/0149870 A1* | 5/2015 | Kozat | G06F 11/1096 |
| | | | 714/772 |
| 2016/0057226 A1* | 2/2016 | Bestler | H04L 67/1095 |
| | | | 709/217 |
| 2016/0132268 A1* | 5/2016 | Koifman | G06F 3/0661 |
| | | | 711/170 |
| 2016/0205190 A1 | 7/2016 | Bestler et al. | |
| 2017/0255522 A1 | 9/2017 | Wang et al. | |
| 2018/0018229 A1* | 1/2018 | Bestler | G06F 3/067 |

FOREIGN PATENT DOCUMENTS

| | | |
|---|---|---|
| CN | 103984607 A | 8/2014 |
| CN | 104866430 A | 8/2015 |
| CN | 105095013 A | 11/2015 |
| EP | 2787446 B1 | 10/2017 |

OTHER PUBLICATIONS

International Search Report and Written Opinion issued in International Application No. PCT/CN2017/103678 dated Jan. 5, 2018, 20 pages.

* cited by examiner

700

Send, to a third target storage site, a data modification request for modifying a third target data object; and when the third target storage site is a faulty storage site, send the data modification request to the coordinator manager, so that the coordinator manager obtains a stripe list ID corresponding to the third target data object, determines a normal storage node that has a stripe list ID the same as the stripe list ID as a third temporary storage site, and instructs to send the data modification request to the third temporary storage site, and the third temporary storage site modifies the third target data object according to the data modification request  — S7-210

Store the data modification request in the third temporary storage site, so that the third temporary storage site obtains, based on a stripe ID corresponding to the third target data object, a third backup data chunk that is from a third target backup site having a stripe ID the same as the stripe ID corresponding to the third target data object and that corresponds to the third target data object, restores, based on the third backup data chunk, a third target data chunk including the third target data object, and sends a difference value between an updated value carried in the data modification request and an original value of the third target data object to the third target backup site, and the third target backup site updates the third backup data chunk based on the difference value  — S7-210-1

After a fault of the third target storage site is cleared, migrate the data modification request stored in the third temporary storage site to the third target storage site, so that the third target storage site modifies the third target data object in the third target storage site according to the data modification request  — S7-210-2

FIG. 7H

DATA PROCESSING METHOD, SYSTEM, AND APPARATUS

CROSS-REFERENCE TO RELATED APPLICATIONS

This application is a continuation of International Application No. PCT/CN2017/103678, filed on Sep. 27, 2017, which claims priority to Chinese Patent Application No. 201610875562.X, filed on Sep. 30, 2016. The disclosures of the aforementioned applications are hereby incorporated by reference in their entireties.

TECHNICAL FIELD

The present invention relates to the computing field, and more specifically, to a data processing method, system, and apparatus.

BACKGROUND

As a price of a memory drops, a distributed memory storage system is widely applied to a distributed computing system, to store hot data. A most commonly used data storage manner is key-value (key-Value, KV) pair storage. Currently, mainstream commercial products include Memcached, Redis, RAMCloud, and the like, and are commercially applied to data storage systems of Twitter, Facebook, and Amazon.

A mainstream fault tolerance method of the distributed memory storage system is mainly a full backup solution. A manner of the full backup solution is replicating an entire piece of data to different devices. When some devices become faulty, backup data on other devices that are not faulty may be used to restore data on the faulty devices. This implementation solution is simple and reliable. However, data redundancy is relatively high, and at least two backups are required. In addition, to ensure data consistency, data modification efficiency is not high.

Another fault tolerance solution is an erasure coding (Erasure Coding, EC) fault tolerance solution. An erasure coding technology is used to encode data, to obtain an erasure code (Parity). A length of the erasure code is usually less than a length of original data. The original data and the erasure code are distributed on a plurality of different devices. When some devices become faulty, a part of the original data and a part of the erasure code may be used to restore complete data. In this way, an overall data redundancy rate is less than 2, and an objective of saving memory is achieved.

Currently, mainstream technologies using erasure coding include LH*RS, Atlas, Cocytus, and the like. In these technologies, erasure coding is performed on a value of a key-value (KV) pair, and the full backup solution is still used for other data of the key-value pair. Specifically, a KV data structure of first target data (object) usually includes three parts: a key, a value, and metadata. The key is a unique identifier of the first target data, and may be used to uniquely determine the corresponding first target data. The value is actual content of the first target data. The metadata stores some attribute information of the first target data. The attribute information is, for example, a size of the key, a size of the value, or a timestamp of creating/modifying the first target data. When a current mainstream erasure coding technology is used to back up the first target data, the full backup solution is used for a metadata part and a key part of the first target data, and the EC solution is used for a value part. For example, three data objects need to be stored and backed up, and are represented by using M1, M2, M3, Data 1, Data 2, and Data 3, where M represents metadata and a key of a data object, and Data is a value of the data object. In this case, EC encoding is performed on the Data 1, the Data 2, and the Data 3, to obtain error-correcting codes Parity 1 and Parity 2. The five pieces of data, that is, the Data 1, the Data, the Data 3, the Parity 1, and the Parity 2, are distributed on five devices, and three duplicates of each of M1, M2, and M3 are created and are distributed on the five devices.

This solution may also be referred to as a partial encoding storage solution. In a scenario in which a large data object is stored, to be specific, in a scenario in which a data length of metadata and a key is far less than a data length of a value, the partial encoding storage solution has relatively high storage efficiency. However, this solution has low efficiency in processing a small data object, because a data length of metadata and a key of the small data object is slightly different from a data length of a value of the small data object, or even the data length of the metadata and the key is greater than the data length of the value. According to statistics released by Facebook, most of data objects stored in memory storage are small data objects, and even more than 40% of the data objects have less than 11 bits. This indicates that most data is small data. EC encoding cannot be used to advantage in such a partial encoding storage solution. As a result, data storage redundancy is relatively high, and storage costs are increased.

SUMMARY

This application provides a data processing method, system, and apparatus, to reduce data redundancy during storage of a data object, and reduce storage costs.

According to a first aspect, this application provides a data processing method, where the data processing method includes: encoding a data chunk of a predetermined size, to generate an error-correcting data chunk corresponding to the data chunk, where the data chunk includes a data object, and the data object includes a key, a value, and metadata; and generating a data chunk index and a data object index, where the data chunk index is used to retrieve the data chunk and the error-correcting data chunk corresponding to the data chunk, the data object index is used to retrieve the data object in the data chunk, and each data object index is used to retrieve a unique data object.

In the method, a plurality of data objects are gathered in one data chunk and are encoded in a centralized manner. In this way, data encoding and backup can be effectively used to advantage. In other words, data redundancy is relatively low. This avoids disadvantages of low efficiency and high system redundancy that are caused by independent encoding and backing up of each data object.

In a first implementation of the first aspect of the present invention, before the encoding a data chunk of a predetermined size, to generate an error-correcting data chunk corresponding to the data chunk, in the method, the plurality of data objects first need to be stored in the data chunk of the predetermined size, where the data chunk of the predetermined size is located in a first storage device, the data chunk of the predetermined size may be specifically a storage address that is unoccupied in the first storage device, and the predetermined size is an optimum data size, for example, 4 KB, based on which encoding and backup can be used to advantage and a reading speed and storage reliability of a data object stored in the data chunk can be ensured. After the encoding a data chunk of a predetermined size, to generate an error-correcting data chunk corresponding to the data chunk, the method further includes: storing the error-correcting data in a second storage device, where the first storage device and the second storage device are located at different locations in a distributed storage system.

In the method, the data chunk and the corresponding error-correcting data chunk are stored at different storage locations in the distributed storage system, for example, the first storage device and the second storage device. This can ensure that when some parts of the first storage device become faulty, data in the faulty storage device can be restored based on data in the second storage device and other parts of the first storage device that operate normally. Therefore, the distributed storage system can have a redundancy capability that meets a basic requirement, namely, reliability. The first storage device may be understood as a conventional data server configured to store the data chunk, and the second storage device may be understood as a parity server that stores the error-correcting data chunk of the data chunk. When a maximum of M servers (M data servers, M parity servers, or M servers including data servers and parity servers) in K data servers and M parity servers become faulty, remaining K servers may restore data in the faulty servers by using an encoding algorithm. The encoding algorithm may be EC encoding, XOR encoding, or another encoding algorithm that can implement data encoding and backup.

With reference to another implementation of the first implementation of the first aspect of the present invention, the data chunk index includes a stripe list ID, a stripe ID, and location information; the stripe list ID is used to uniquely determine one of a plurality of storage device groups in the distributed storage system, and the storage device group includes a plurality of first devices and a plurality of second devices; the stripe ID is used to determine a sequence number of an operation of storing the data chunk and the error-correcting data chunk corresponding to the data chunk in the storage device group indicated by the stripe list ID; and the location information is used to determine a first storage device that is in the storage device group determined based on the stripe list ID and in which the data chunk is located, and a second storage device that is in the storage device group determined based on the stripe list ID and in which the error-correcting data chunk is located.

To restore a storage device after the storage device becomes faulty, in the present invention, a manner of a three-level index, that is, a stripe list ID, a stripe ID, and location information, is used to retrieve a data chunk. When a client needs to access a data chunk, the client may reconstruct a correct data chunk based on the index in combination with a key of a data object index, and all requests in a faulty period may be processed by another storage device determined based on the stripe ID. After the faulty storage device is restored, data is migrated to the restored storage device in a unified manner. This effectively ensures reliability of a distributed storage device using the data management method. The data chunk index and the data object index are stored in both the first storage device and the second storage device. The data chunk index and the data object index are generated in the first storage device, and the data chunk index and the data object index are generated in the second storage device. Therefore, redundancy backup is not required, and when the faulty device is restored, an index can be reconstructed locally.

With reference to another implementation of any implementation of the first aspect of the present invention, before the plurality of data objects are stored in the data chunk of the predetermined size, the method further includes: selecting one first storage device and one or more second storage devices; and separately sending the plurality of data objects to the first storage device and the second storage device.

A data storage method in the present invention allows the client to specify the first storage device and the second storage device before sending a service request, for example, a data storage service request. The first storage device and the second storage device may be pre-selected. In other words, the second storage device is a dedicated backup site of the first storage device, namely, a parity server. In this way, an addressing operation in a data storage and backup process can be simplified. For ease of searching for the first storage device and the second storage device, the first storage device and the second storage device are included in a same stripe, so that the first storage device and the second storage device have a same stripe identifier, namely, a stripe ID. In addition, when the second storage device is selected, load statuses of a plurality of candidate storage devices in the distributed storage system may be further referenced, and one or more candidate storage devices with minimum load are used as the one or more second storage devices. In this way, workload of sites can be balanced in the entire distributed storage system, device utilization is improved, and overall data processing efficiency is improved.

With reference to another implementation of a third implementation of the first aspect of the present invention, the first storage device stores the data object in the data chunk; when a size of the data object in the data chunk approximates or equals a storage limit of the data chunk, stops writing a new data object into the data chunk; and sends, to the second storage device, key values of all data objects stored in the data chunk; and the second storage device receives the key values, sent by the first storage device, of all the data objects in the data chunk, reconstructs the data chunk in the second storage device based on the key values of the data objects, and encodes the reconstructed data chunk.

The method ensures that content in each data chunk is not greater than the preset storage limit, to ensure that a size of a data unit is smallest by using the data management method. Therefore, encoding and backup can be fully used to advantage while a system throughput is ensured.

With reference to a fifth implementation of any implementation of the first aspect of the present invention, when the data chunk includes the plurality of data objects, the method further includes: determining whether a size of a to-be-stored data object is less than a threshold, and store and encode the to-be-stored data object whose size is less than the threshold.

To effectively use the data management method in the present invention to advantage, and to avoid an operation such as data segmentation performed on a relatively large data object when the relatively large data object is stored in the data chunk, a threshold filtering manner is used, and a small data object is stored in the data chunk, to ensure that the method can effectively overcome disadvantages of low efficiency and high data redundancy that are caused when the small data object is stored and backed up. In addition, in a continuous time period, sizes of data objects usually have a particular similarity. In the method, the threshold can further be dynamically adjusted, so that the method can be more widely applied, and can be more suitable for data characteristics of the Internet.

With reference to another implementation of any implementation of the first aspect of the present invention, the method further includes: the storing, by the first storage device, the data object in the data chunk includes: when the size of the data object is greater than a size of storage space in the data chunk, or when the size of the data object is greater than a size of remaining storage space in the data chunk, segmenting the data object, storing, in the data chunk, a segmented data object whose size after the segmentation is less than the size of the storage space in the data chunk or less than the size of the remaining storage space in the data chunk, and storing data chunk segmentation information in metadata of the segmented data object, to recombine the segmented data object.

In a process of storing the data object, if the data object is excessively large or the size of the data object is greater than the size of the storage space in the data chunk, segmentation of the data chunk may be allowed for storage in the present invention. In this way, applicability of the method can be improved, and complexity of the method can be reduced.

According to a second aspect, a data management method is provided, where the method includes: selecting one storage site and a plurality of backup sites for a to-be-stored data object, where the storage site and the plurality of backup sites have a same stripe list ID; and sending the to-be-stored data object to the storage site and the plurality of backup sites, where the data object includes metadata, a key, and a value;

in the storage site, storing the to-be-stored data object in a data chunk that has a constant size and that is not encapsulated, adding data index information of the to-be-stored data object to a data index, where the data index includes data index information of all data objects in the data chunk, and generating a data chunk index; in the backup site, storing the to-be-stored data object in a temporary buffer; after the to-be-stored data object is stored in the data chunk, if a total data size of all the data objects stored in the data chunk approximates a storage limit of the data chunk, encapsulating the data chunk, sending a key list of all the data objects stored in the encapsulated data chunk to the backup site, and generating a same stripe ID for the storage site and the backup site; and after receiving the key list, retrieving, by the backup site from the temporary buffer based on a key in the key list, a data object corresponding to the key, reconstructing, based on the data object, a data chunk corresponding to the key list, encoding the reconstructed data chunk, to obtain a backup data chunk, and updating the data chunk index and the data object index that is stored in the backup site and that corresponds to the encapsulated data chunk.

In the method, a plurality of data objects are gathered in one data chunk and are encoded in a centralized manner. In this way, data encoding and backup can be effectively used to advantage. In other words, data redundancy is relatively low. This avoids disadvantages of low efficiency and high system redundancy that are caused by independent encoding and backing up of each data object. It should be noted that in the method, the storage site and the backup site are usually disposed at different locations in a distributed storage system, to provide a required redundancy capability. In other words, when a storage site becomes faulty, content in the storage site can be restored by using a backup site. In addition, in the method, a data storage method may be combined with the method provided in the first aspect of the present invention, for example, the methods that are provided in the first aspect of the present invention and that are for selecting a storage device, screening a data object, and segmenting a data object. For example, the method may include the solutions in the first aspect of the present invention. (1) When the data chunk includes the plurality of data objects, the method further includes: determining whether a size of a to-be-stored data object is less than a threshold, and store and encode the to-be-stored data object whose size is less than the threshold; (2) dynamically adjusting the threshold at a predetermined time interval based on an average size of the to-be-stored data object; (3) when the distributed storage system includes a plurality of candidate storage devices, using one or more candidate storage devices with minimum load as the one or more second storage devices based on load statuses of the plurality of candidate storage devices; and (4) when a size of the data object is greater than a size of storage space in the data chunk, or when the size of the data object is greater than a size of remaining storage space in the data chunk, segmenting the data object, storing, in the data chunk, a segmented data object whose size after the segmentation is less than the size of the storage space in the data chunk or less than the size of the remaining storage space in the data chunk, and storing data chunk segmentation information in metadata of the segmented data object, to recombine the segmented data object.

With reference to the second aspect, in an implementation of the second aspect, the method further includes: searching for, based on a key of a first target data object, the first target data object, a first target data chunk in which the first target data object is located, and a first target storage site in which the first target data chunk is located; sending an updated value of the first target data object to the first target storage site; updating a value of the first target data object in the first target storage site based on the updated value, and sending a difference value between the updated value of the first target data object and an original value of the first target data object to all first target backup sites that have a stripe ID the same as that of the first target storage site; and if the first target data chunk is not encapsulated, finding, based on the key, the first target data object stored in a buffer of the first target backup site, and adding the difference value and the original value of the first target data object, to obtain the updated value of the first target data object; or if the first target data chunk is already encapsulated, updating, based on the difference value, first target backup data chunks that are in the plurality of first target backup sites and that correspond to the first target data chunk.

In the method, a data updating method is provided, so that data synchronization can be implemented for a target data object and a corresponding target backup data chunk in a most economical way by using the foregoing method.

With reference to the foregoing implementation of the second aspect, in another implementation of the second aspect, the method further includes: searching for, based on the key of the first target data object, the first target data object, the first target data chunk in which the first target data object is located, and the first target storage site in which the first target data chunk is located; sending, to the first target storage site, a delete request for deleting the first target data object; and if the first target data chunk is not encapsulated, deleting the first target data object in the first target storage site, and sending a delete instruction to the first target backup site, to delete the first target data object stored in the buffer of the first target backup site; or if the first target data chunk is already encapsulated, setting the value of the first target data object in the first target storage site to a special value, and sending a difference value between the special value and the original value of the first target data object to the plurality of first target backup sites, so that the first target backup data chunks in the plurality of first target backup sites are updated based on the difference value, where the first target backup data chunks correspond to the first target data chunk.

In the method, a data deletion method that can reduce system load is provided. To be specific, a target data object stored in the data chunk is not deleted immediately; instead, a value of the target data object is set to a special value, for example, 0, and the target data object may be deleted when the system is idle.

With reference to any one of the second aspect or the foregoing implementations based on the second aspect, in another implementation of the second aspect, the method further includes: selecting one second target storage site and a plurality of second target backup sites for a second target data object, where the second target storage site and the plurality of second target backup sites have a same stripe list ID; sending the second target data object to the second target storage site; when the second target storage site is a faulty storage site, sending the second target data object to a coordinator manager, so that the coordinator manager obtains a stripe list ID corresponding to the second target data object, determines a normal storage site that has a stripe list ID the same as the stripe list ID as a first temporary storage site, and instructs to send the second target data object to the first temporary storage site for storage; storing the second target data object in the first temporary storage site; and after a fault of the second target storage site is cleared, migrating the second target data object stored in the first temporary storage site to the second target storage site whose fault is cleared.

The method ensures that, in the data management method, when a specified second target storage site becomes faulty, the coordinator manager specifies a first temporary storage site to take the place of the faulty second target storage site, and when the faulty second target storage site is restored, migrates, to the second target storage site, the second target data object that is stored in the first temporary storage site and that points to the second target storage site; and the second target storage site stores the second target data object according to a normal storage method.

With reference to any one of the second aspect or the foregoing implementations based on the second aspect, in another implementation of the second aspect, the method further includes: sending, to the second target storage site, a data obtaining request for requesting the second target data object; and when the second target storage site is the faulty storage site, sending the data obtaining request to the coordinator manager, so that the coordinator manager obtains, according to the data obtaining request, the stripe list ID corresponding to the second target data object, determines a normal storage site that has a stripe list ID the same as the stripe list ID as a second temporary storage site, and instructs to send the data obtaining request to the second temporary storage site, and the second temporary storage site returns the corresponding second target data object according to the data obtaining request.

In the method, it can be ensured that, in this data management method, even if a second target storage site becomes faulty, a client can still be allowed to access a data object stored in the faulty second target storage site. A specific method is described as above, and the second temporary storage site takes the place of the second target storage site, to implement access to the faulty site, thereby improving system reliability.

With reference to any one of the second aspect or the foregoing implementations based on the second aspect, in another implementation of the second aspect, the returning, by the second temporary storage site, the corresponding second target data object according to the data obtaining request includes:

if a second data chunk in which the second target data object is located is not encapsulated, sending, by the second temporary storage site, a data request to the second target backup site corresponding to the second target storage site; obtaining, by the second target backup site, the corresponding second target data object from a buffer of the second target backup site according to the data request, and returning the second target data object to the second temporary storage site; and returning, by the second temporary storage site, the requested second target data object; and if the second target data object requested by the data request is newly added or modified after the second target storage site becomes faulty, obtaining the corresponding second target data object from the second temporary storage site, and returning the corresponding second target data object; or otherwise, obtaining, by the second temporary storage site based on a stripe ID corresponding to the second target data object, a second backup data chunk that is from a second target backup site having a stripe ID the same as the stripe ID corresponding to the second target data object and that corresponds to the second target data object, restoring, based on the second backup data chunk, a second target data chunk including the second target data object, obtaining the second target data object from the second target data chunk, and returning the second target data object.

In the method, when a data storage site, for example, the second target storage site, becomes faulty, a fault occurrence time point and duration are uncertain. Therefore, the method provides methods for accessing data in the faulty site in a plurality of different cases, to improve system flexibility and applicability.

With reference to any one of the second aspect or the foregoing implementations based on the second aspect, in another implementation of the second aspect, the method further includes: sending, to a third target storage site, a data modification request for modifying a third target data object; and when the third target storage site is a faulty storage site, sending the data modification request to the coordinator manager, so that the coordinator manager obtains a stripe list ID corresponding to the third target data object, determines a normal storage site that has a stripe list ID the same as the stripe list ID as a third temporary storage site, and instructs to send the data modification request to the third temporary storage site, and the third temporary storage site modifies the third target data object according to the data modification request.

In the method, when the third target storage site becomes faulty, the third temporary storage site may process modification performed on the third target data object, keep data in a third target backup site consistent with the modified third target data object, and after the third target storage site is restored, re-send the modification request to the third target storage site, so that the data in the third target backup site is consistent with third target data in the third target storage site.

With reference to any one of the second aspect or the foregoing implementations based on the second aspect, in another implementation of the second aspect, the modifying, by the third temporary storage site, the third target data object according to the data modification request includes: storing the data modification request in the third temporary storage site, so that the third temporary storage site obtains, based on a stripe ID corresponding to the third target data object, a third backup data chunk that is from a third target backup site having a stripe ID the same as the stripe ID corresponding to the third target data object and that corresponds to the third target data object, restores, based on the third backup data chunk, a third target data chunk including the third target data object, and sends a difference value between an updated value carried in the data modification request and an original value of the third target data object to the third target backup site, and the third target backup site updates the third backup data chunk based on the difference value; and after a fault of the third target storage site is cleared, migrating the data modification request stored in the third temporary storage site to the third target storage site, so that the third target storage site modifies the third target data object in the third target storage site according to the data modification request.

According to a fourth aspect, a data management apparatus is provided, where the data management apparatus includes a unit or a module configured to perform the method in the first aspect.

According to a fifth aspect, a data management system is provided, where the data management system includes various functional bodies, for example, a client, a storage site, a backup site, and a coordinator manager, and is configured to perform the method in the second aspect.

According to a sixth aspect, a data management apparatus is provided, where the data management apparatus includes a unit or a module configured to perform the method in the second aspect.

A seventh aspect of the present invention provides a data structure, including:

a plurality of data chunks of a constant size, stored in a first storage device first storage device, where each data chunk includes a plurality of data objects, and each data object includes a key, a value, and metadata;

a plurality of error-correcting data chunks, stored in a second storage device, where the error-correcting data chunks are obtained by encoding the plurality of data chunks of the constant size, and the first storage device and the second storage device are located at different locations in a distributed storage system;

a data chunk index, where the data chunk index is used to retrieve the data chunks and the error-correcting data chunks corresponding to the data chunks; and a data object index, where the data object index is used to retrieve the data objects in the data chunks, and each data object index is used to retrieve a unique data object.

In the data structure provided in the present invention, the plurality of data objects are gathered in one data chunk, a corresponding error-correcting data chunk is constructed for the data chunk, the data chunk and the error-correcting data chunk are respectively distributed at different storage locations, namely, the first storage device and the second storage device, in the distributed storage system, and a data chunk index is associated with the data chunk and the error-correcting data chunk. When the first storage device in which the data chunk is located becomes faulty, content in the original data chunk can be restored based on the data structure, and encoding and backup can be fully used to advantage, thereby implementing relatively low data redundancy. This avoids disadvantages of low efficiency and high system redundancy that are caused by independent encoding and backing up of each data object.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 7A to FIG. 7H are schematic flowcharts of a data management method according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
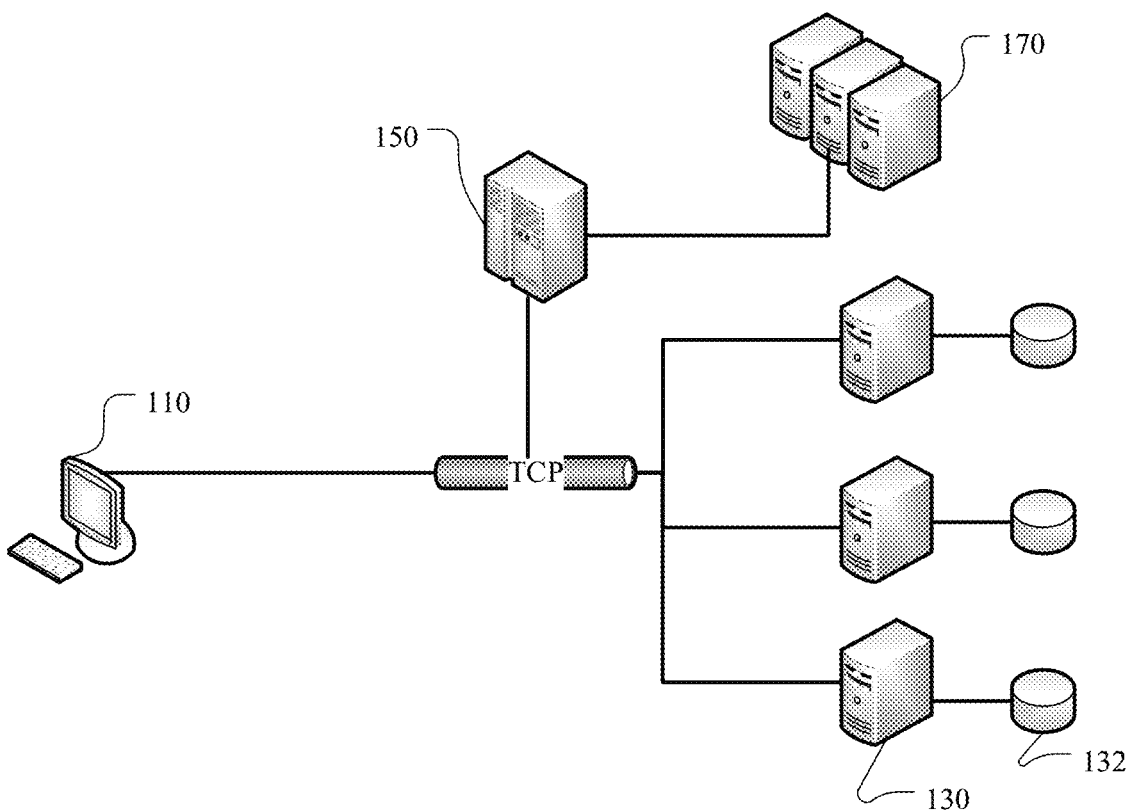
FIG. 1 is a schematic architectural diagram of a distributed storage system.

The following describes composition of a distributed storage system. FIG. 1 is a schematic architectural diagram of a distributed storage system 100. Referring to FIG. 1, the distributed storage system 100 includes the following key entities: a client 110, a storage site 130, a coordinator manager 150, and a backup site 170. These key entities are connected by using a network. For example, normal operation of information transmission channels between the key entities is maintained by using a long-term Transmission Control Protocol (Transmission Control Protocol, TCP).

The client 110 is an access point of an upper-layer service provided by the distributed storage system 100, and is connected to each key entity of the storage system 100 by using a communications network. The client 110 serves as an initiator of a service request and may initiate a service request to the storage site 130. The service request may include requesting data, writing data, modifying data, updating data, deleting data, and the like. The client 110 may be a device such as a handheld device, a consumer electronic device, a general-purpose computer, a special-purpose computer, a distributed computer, or a server. It may be understood that, to implement a basic function of the client 110, the client 110 should have a processor, a memory, an I/O port, and a data bus connecting these components.

The storage site 130 is configured to store a data object (data object). The storage site 130 may be allocated by a network server in a unified manner. To be specific, the storage site 130 is homed on one or more servers that are connected by using a network, and is managed by the server in a unified manner. Therefore, the storage site 130 may also be referred to as a data server (Data server). The storage site 130 may be further connected to a disk 132 that is configured to store some seldom-used data.

The coordinator manager 150 is configured to manage the whole distributed storage system 100, for example, use a heartbeat mechanism to detect whether the storage site 130 and/or the backup site 170 become/becomes faulty, and be responsible for restoring, when some sites become faulty, data objects stored in the faulty sites.

The backup site 170 is configured to back up the data object stored in the storage site 130, and is also referred to as a backup server or a parity server (Parity server). It should be noted that the backup site 170 and the storage site 130 are relative concepts and may interchange roles depending on different requirements. The backup sites 170 may be distributed at different geographical locations or network topologies. Specifically, the backup site 170 in form may be any device that can instantly store data, such as a network site (site) or a memory of a distributed server.

It should be noted that all the key entities included in the distributed storage system 100 have a data processing capability, and therefore all the key entities have such components as a CPU, a buffer (memory), an I/O interface, and a data bus. In addition, a quantity of each type of the key entities may be at least one, and quantities of the key entities may be the same or different. For example, in some system environments, a quantity of the backup sites 170 needs to be greater than a quantity of the storage sites 130; and in some environments, a quantity of the backup sites 170 may be equal to a quantity of the storage sites, or even less than a quantity of the storage sites 130.

The following describes in detail a data management method 200 that is proposed in the present invention based on the foregoing distributed storage system 100. The data management method 200 is mainly performed by a storage site 130 and a backup site 170, to describe how to store a data object having a relatively small data length.

Figure 2:
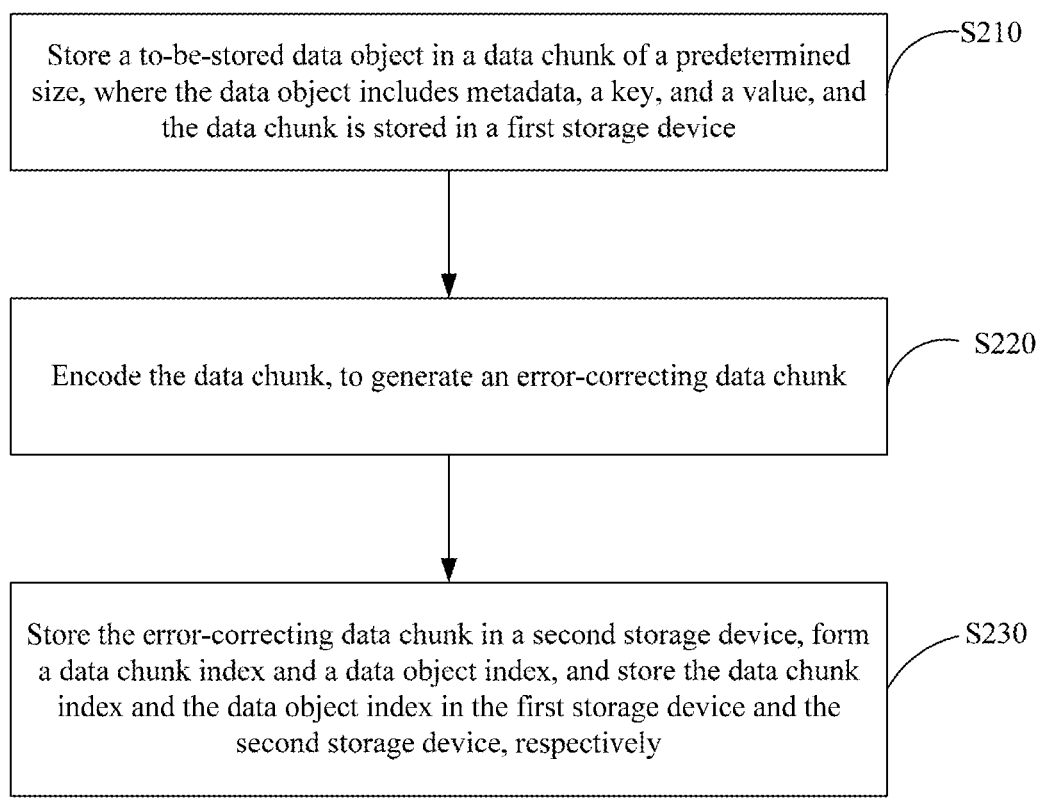
FIG. 2 is a schematic flowchart of a data management method according to an embodiment of the present invention.

As shown in FIG. 2, the data management method 200 in the present invention includes the following steps.

S210. Store a to-be-stored data object in a data chunk of a predetermined size (size/volume/capacity), where the data object includes a key (key), a value (value), and metadata (metadata), and the data chunk is stored in a first storage device.

In an application scenario in which current data object sizes are relatively small, in the present invention, a predetermined size (size/volume/capacity) is preset for a data chunk, to store these small data objects. The data chunk (Data Chunk) of the predetermined size may be visually understood as a data container. The data container has a predetermined volume, namely, a constant size, for example, 4 KB. The to-be-stored data object has a KV (Key-value) structure, that is, a key-value structure. The data structure includes three parts: a key (Key), a value (Value), and metadata (Metadata). The key is a unique identifier of the data object, and the key may be used to uniquely determine the corresponding data object, so that when the stored data object is to be read, modified, updated, or deleted, a first target data object is located by using the key. The value is actual content of the data object. The metadata stores attribute information of the data object, such as a size of the key, a size of the value, a timestamp of creating/modifying the data object, and like information. A plurality of small data objects are stored in the data chunk of the predetermined size. When a size of the data objects stored in the data chunk approximates or equals a size limit of the data chunk, the data chunk is encapsulated. In other words, new data is no longer written into the data chunk.

In most cases, a size of the to-be-stored data object is less than a size of the data chunk. Correspondingly, the data chunk in which the data object is stored is a data chunk that has a predetermined size and that includes a plurality of data objects. In some cases, the size of the to-be-stored data object is greater than the size of the data chunk, or the size of the to-be-stored data object is greater than a size of remaining available storage space in the data chunk. The to-be-stored data object may be segmented to obtain small-size data objects. For example, a data object A is segmented into a plurality of small-size data objects a1, a2, . . . , and aN whose sizes approximate the data size, where A=a1+a2+ . . . +aN, and N is a natural number. Sizes of the data objects a1, a2, . . . , and aN may be the same. In other words, the data objects have a unified size. Alternatively, the sizes of the data objects may be different. All or some data objects have different sizes. A size of at least one data object aM ($1 \leq M \leq N$) of the small data objects a1, a2, . . . , and aN that are obtained through segmentation is less than the size of the data chunk or less than the size of the remaining available storage space in the data chunk. The small-size data object aM obtained through segmentation is stored in the data chunk, and segmentation information is stored in metadata (metadata) of the small data object aM. Remaining data objects in the small-size data objects a1, a2, . . . , and aN except aM are stored in a new data chunk of a constant size, and the new data chunk of the constant size is preferably located in a different storage site 130. When the data object A is read, the data objects a1, a2, . . . , and aN stored in the different storage site 130 are found based on a key of the data object A, and the data objects a1, a2, . . . , and aN are recombined based on segmentation information in metadata, to obtain the original data object. There may be a plurality of data chunks of a constant size, and the plurality of data chunks are preferably located in a plurality of different storage sites 130. In addition, the data chunks may be alternatively located in different storage partitions of a same storage site 130, and each data chunk has a predetermined size. Preferably, the plurality of data chunks have a same constant size.

The data chunk of the predetermined size is a virtual data container. The virtual data container may be considered as storage space in a storage device. For ease of understanding, the storage device may be referred to as the first storage device. The first storage device may specifically correspond to a storage site 130 in the distributed storage system 100. An implementation process of storing the to-be-stored data object in the distributed storage system 100 may be as follows: A client 110 initiates a data storage request, where the data storage request carries specific location information of the storage site 130, and sends, to the storage site 130, that is, the first storage device, based on the location information and for storage, the to-be-stored data object carried in the data storage request; the storage site 130 stores the to-be-stored data object in a data chunk that is not encapsulated; and if the data chunk has no remaining storage space after the to-be-stored data object is received, or the remaining storage space is less than a predetermined threshold, the storage site 130 encapsulates the data chunk, and a new data object is no longer accepted by the encapsulated data chunk. In this case, the storage site 130 may add, to a storage success message returned to the client 110, a message indicating that the data chunk is already encapsulated, and when initiating a new storage request, the client 110 may select a different storage site 130 for performing a storage operation.

S220. Encode the data chunk, to generate an error-correcting data chunk.

When a total size of data objects stored in the data chunk approximates the size limit of the data chunk, a data object is no longer stored in the data chunk. In other words, the data chunk is encapsulated. Specifically, a write operation attribute may be disabled for the data object. Then, data redundancy encoding, such as XOR encoding or EC encoding, is performed on the data chunk. EC encoding is used as an example to describe how to perform redundancy encoding. An EC encoding process may be understood as: Information including K objects is changed to information including K+M objects, and when any M or fewer objects of the K+M objects are damaged, the M damaged objects can be restored by using remaining K objects. A relatively frequently-used EC encoding algorithm is Reed-Solomon Code (Reed-solomon codes, RS-code). According to the RS-code, the following formula is used to calculate error-correcting data (parity) in a finite field based on original data, namely, the data chunk.

$$\begin{bmatrix} P_1 \\ P_2 \\ \vdots \\ P_M \end{bmatrix} = \begin{bmatrix} 1 & 1 & \ldots & 1 \\ 1 & a_1^1 & \ldots & a_1^{K-1} \\ \vdots & \vdots & \ddots & \vdots \\ 1 & a_{M-1}^1 & \ldots & a_{M-1}^{K-1} \end{bmatrix} * \begin{bmatrix} D_1 \\ D_2 \\ \vdots \\ D_K \end{bmatrix}$$

$D_1$ to $D_K$ represent data chunks, $P_1$ to $P_M$ represent error-correcting data chunks, and a matrix is referred to as a Vandermonde matrix. In the present invention, the error-correcting data chunk may be generated by using the RS-Code. The error-correcting data chunk and the data chunk may be used to restore damaged data chunks within a maximum acceptable damage range, in other words, a quantity of the damaged data chunks is not greater than M.

A main objective of encoding the data chunk is to perform redundancy backup on the data chunk, to restore data in the first storage device when the first storage device becomes faulty. In this step, an execution body that performs the encoding operation may be the storage site 130 or the backup site 170 in the distributed storage system 100. The encoding operation is usually implemented by the backup site 170, and an example implementation process may be as follows: When sending the to-be-stored data object to the storage site 130, the client 110 sends the to-be-stored data object to the backup site 170; the backup site temporarily stores the to-be-stored data object in a buffer of the backup site; after the data chunk in which the data object is stored is encapsulated, the storage site 130 sends a key list of data objects in the encapsulated data chunk to the backup site 170; after receiving the key list, the backup site 170 reconstructs the data chunk in the backup site 170 based on the key list and the data object that is temporarily stored in the buffer of the backup site, and encodes the data chunk, to form the error-correcting data chunk; and after the error-correcting data chunk is generated, the backup site 170 discards the data object that is in the buffer of the backup site and that corresponds to the key list. It should be noted that the encoding process may be implemented by the storage site 130. To be specific, after encapsulating the data chunk in which the to-be-stored data object is stored, the storage site 130 replicates the encapsulated data chunk, and performs the encoding operation on the duplicated encapsulated data chunk, to obtain the error-correcting data chunk.

S230. Store the error-correcting data chunk in a second storage device, form a data chunk index and a data object index, and store the data chunk index and the data object index in the first storage device and the second storage device, respectively, where the data chunk index is used to retrieve the data chunk and the error-correcting data chunk corresponding to the data chunk, the data object index is used to retrieve the data object in the data chunk, each data object index is used to retrieve a unique data object, and the second storage device is different from the first storage device.

After the error-correcting data chunk is generated, the error-correcting data chunk is distributed in the second storage device that is different from the first storage device. The different first storage device and second storage device may be two different storage sites in a distributed storage device, for example, the storage site 130 and the backup site 170 in the distributed storage system 100. That the first storage device is different from the second storage device may be understood as: The first storage device and the second storage device are not spatially or geographically located at a same address, or are not topologically located on a same site. A basic requirement that meets such a "difference" is as follows: When there is a particular reliability requirement, a probability that the storage site 130 and the backup site 170 become faulty at the same time is less than a preset threshold, to ensure that, when a maximum tolerable quantity of storage devices become faulty, a data chunk/data object in the faulty sites can still be restored by using a normal site. Usually, the first storage device and the second storage device are preset. To be specific, a plurality of first storage devices and a plurality of second storage devices are grouped based on a preset requirement, to generate a plurality of groups. Each group is referred to as a stripe list (Stripe list), and each stripe list includes a plurality of first storage devices that may be denoted as K first storage devices and a plurality of second storage devices that may be denoted as M second storage devices. When requesting to store the to-be-stored data object, the client 110 may specify a first storage device and a second storage device in a stripe list by adding the stripe list (Stripe list) to a request of the client 110, to access a data object. For ease of description, the first storage device and the second storage device are merely names provided based on different operations that are undertaken by the first storage device and the second storage device during one time of storing and backing up a data chunk. In an implementation process, no strict limit exists between a first storage device and a second storage device in a stripe list. When processing different data objects, the first storage device may be changed to the second storage device, and the second storage device may also be changed to the first storage device. In a process of storing and backing up a data chunk, when no remaining storage space exists in the data chunk or the remaining storage space is less than a preset value and therefore the data chunk is encapsulated, the first storage device generates a sequence number for the encapsulated data chunk. The sequence number is referred to as a stripe ID, and the stripe ID is used to indicate a sequence number of a current data chunk that is stored and backed up by using the first storage device and the second storage device that are indicated by the stripe list. Storage devices in a same stripe list store and back up a plurality of different data chunks. In a process of storing and backing up each different data chunk, the storage devices in the stripe list undertake different operations. To be specific, some storage devices serve as backup servers to back up data, and some storage devices serve as data servers to store the data. The stripe ID is used to indicate a sequence number of a specific time of storing and backing up a data chunk. A simple construction manner of the stripe ID is as follows: An initial value of the stripe ID is set to 0; after a first data chunk is encapsulated, a data server sets a stripe ID of the first data chunk to 0, and increases the stripe ID by 1; after a second data chunk is encapsulated, the data server sets a stripe ID of the second data chunk to 1, and so on; and a backup server backs up data chunks having a same stripe ID, in other words, performs EC encoding.

In another possible implementation, not all storage devices indicated by the stripe list participate in one time of storing and backing up a data chunk. Instead, some first devices and some second devices that are specified based on the storage request serve as sites to store and back up the data object, to be specific, serve as the storage site 130 and the backup site 170 to store the data chunk and the error-correcting data chunk, respectively. In this case, the specified first devices and second devices form one stripe (Stripe). The different first storage device and second storage device may also be obtained, through random selection from available devices based on a preset condition, by a device performing the data management method, for example, a coordinator manager 150 in the distributed storage system.

Figure 3:
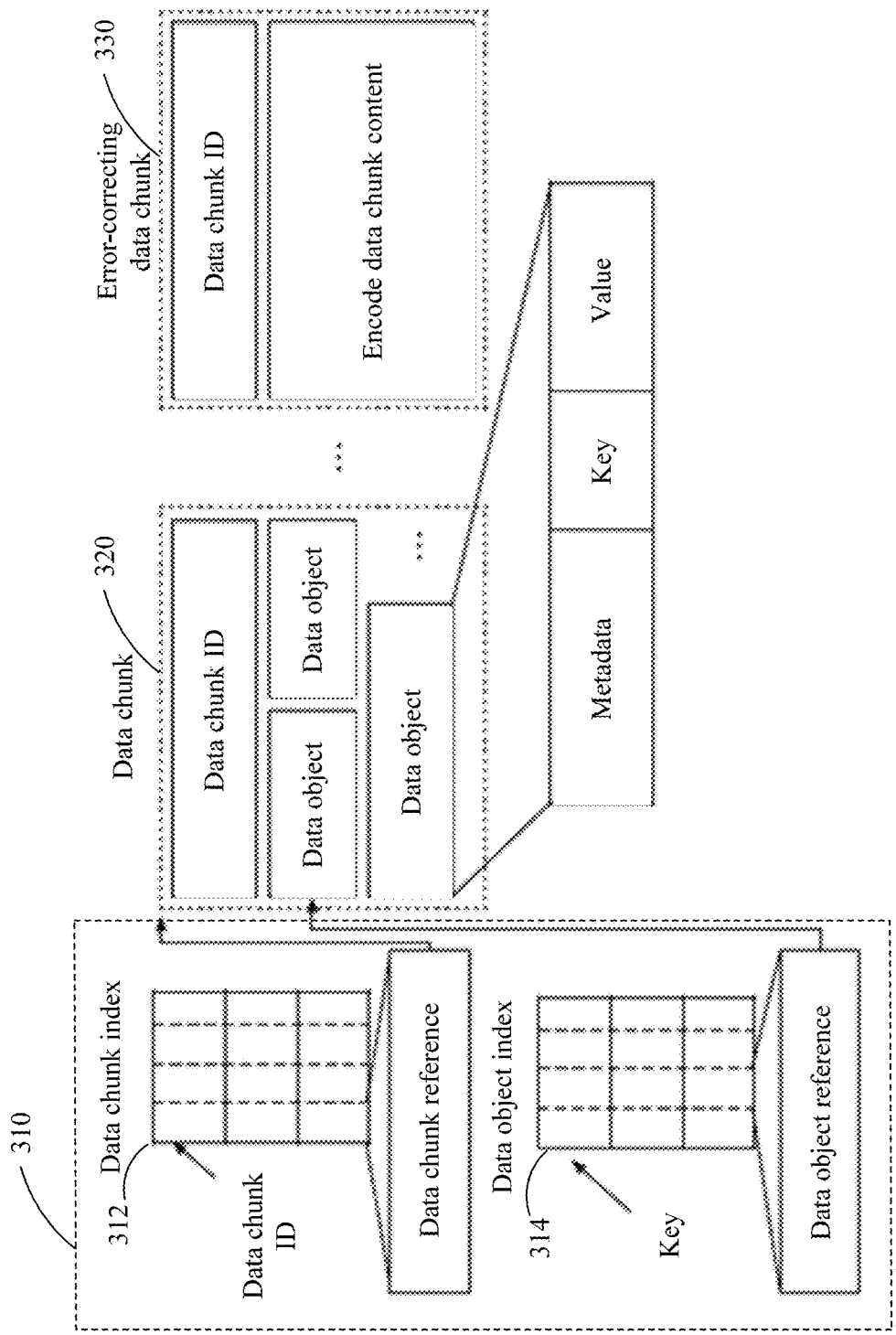
FIG. 3 is an architectural diagram of data generated in a data management method according to an embodiment of the present invention.

After the data chunk in which the to-be-stored data object is stored is encapsulated, and the corresponding error-correcting data chunk is generated, the data chunk index and the data object index are generated in the first storage device and the second storage device, respectively. The distributed storage system 100 is still used as an example. After storing the to-be-stored data object in the data chunk, the storage site 130 generates the data object index corresponding to the stored data object. After the data chunk is encapsulated, the storage site 130 generates the data chunk index. The data chunk index is used to retrieve the data chunk and the error-correcting data chunk corresponding to the data chunk, and the data object index is used to retrieve the data object in the data chunk. The data chunk index, the data object index, the data chunk, and the error-correcting data chunk form a basic structure of a data model of the data management method in the present invention. The data model is shown in FIG. 3 and includes an index part 310, a data part 320, and an error-correcting part 330.

The index part 310 includes a data chunk index 312 and a data object index 314. The data object index 314 is a key of a data object, and each data object index is used to retrieve a unique data object. The data chunk index 312 is used to associate the data chunk in the first storage device and the error-correcting data chunk in the second storage device, so that, when the first storage device becomes faulty, a first target data chunk in the first storage device can be restored from the second storage device by using the data chunk index 312. The data chunk index 312 includes a plurality of data chunk IDs (Chunk ID), and each data chunk ID includes a stripe list ID (Stripe list ID), a stripe ID (Stripe ID), and a data chunk location (Chunk Position).

The stripe list may be identifiers that are preset before the data chunk and the error-correcting data chunk are stored and that indicate the first storage device (which is alternatively referred to as a data storage device and corresponds to the storage site 130) and the second storage device (which is alternatively referred to as an error-correcting storage device and corresponds to the backup site 170), to be specific, K first storage devices and M second storage devices, where K≥1, and M≥1. The stripe ID is used to indicate a sequence number of a current data chunk that is stored and backed up by using the first storage device and the second storage device that are indicated by the stripe list. A first storage device and a second storage device in a same stripe have a same stripe ID.

Alternatively, the stripe ID is used to retrieve a first target stripe in a stripe list determined based on the stripe list ID. The first target stripe is a set of a first storage device configured to store a data chunk and a second storage device configured to store an error-correcting data chunk corresponding to the data chunk. A first storage device and a second storage device in a same stripe have a same stripe ID.

The data chunk location is a specific location of the data chunk or the error-correcting data chunk in the stripe ID, in other words, a first storage device or second storage device that has a same stripe ID includes the data chunk or the error-correcting data chunk. The data chunk index 312 and the data object index 314 are generated and maintained on both the first storage device and the second storage device. The data object index 314 is a global index. When the storage device storing the data chunk operates normally, the data object index 314 may be used to index the first target data object. When the first storage device storing the data chunk becomes faulty, the client needs to maintain a mapping relationship between the data chunk index 312 and the data object index 314. Usually, the mapping relationship may be implemented in a hash manner. Therefore, after a storage device becomes faulty, a data chunk index corresponding to a data object can be determined based on the mapping relationship between the data chunk index 312 and the data object index 314 maintained in a storage device that is not faulty, and an error-correcting data chunk stored in another storage device in a same stripe is determined based on the data chunk index, to restore data in the faulty storage device.

The foregoing data structure may be applicable to data management in any field. A basic data structure may be summarized as:

a plurality of data chunks of a constant size, stored in a first storage device, where each data chunk includes a plurality of data objects, and each data object includes a key, a value, and metadata;

a plurality of error-correcting data chunks, stored in a second storage device, where the error-correcting data chunks are obtained by encoding the plurality of data chunks of the constant size, and the first storage device and the second storage device are located at different locations in a distributed storage system;

a data chunk index, where the data chunk index is used to retrieve the data chunks and the error-correcting data chunks corresponding to the data chunks; and a data object index, where the data object index is used to retrieve the data objects in the data chunks, and each data object index is used to retrieve a unique data object.

According to the data management method in the present invention, after the data model having the foregoing structure is formed, M error-correcting data chunks are obtained after EC encoding is performed on K data chunks, and K+M data chunks are distributed in K+M devices. When any M or fewer devices of the K+M devices become faulty, remaining devices may be utilized to restore the faulty devices. The K data chunks are data chunks having a predetermined size, and may be used to store a plurality of small data objects, and the plurality of small data objects are encoded in a centralized manner by using EC encoding. Therefore, the EC coding can be fully used to advantage, a redundancy rate is reduced, storage efficiency is greatly improved, and storage costs are reduced. In addition, data processing efficiency is also improved, and availability is improved.

Figure 4:
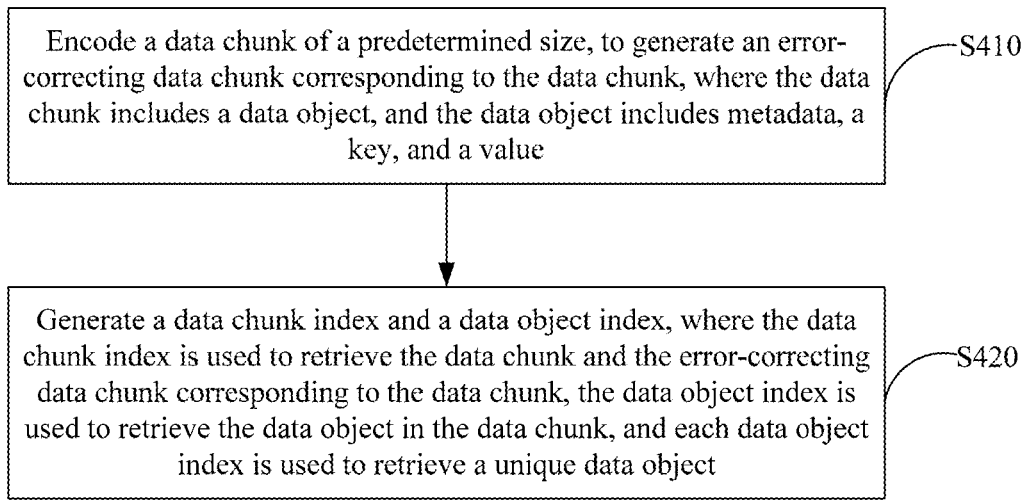
FIG. 4 is a schematic flowchart of a data management method according to another embodiment of the present invention.

The present invention further provides a data management method 400, as shown in FIG. 4, including the following steps.

S410. Encode a data chunk of a predetermined size, to generate an error-correcting data chunk corresponding to the data chunk, where the data chunk includes a data object, and the data object includes metadata, a key, and a value.

A data chunk encoding method in this step is the same as the encoding method used in the data management method 200. For specific implementation details, refer to corresponding parts of the data management method 200. However, this step is completed by a backup site 170. Therefore, an operation of constructing the data chunk in a storage site 130 does not need to be considered. It should be noted that, that the data chunk includes a plurality of data objects means that the data chunk is formed by the plurality of data objects. In this case, the data chunk may require no boundary indication, but is directly formed by a series of consecutively stored data objects. A start storage location of a first data object and an end storage location of a last data object form a boundary of the data chunk.

S420. Generate a data chunk index and a data object index, where the data chunk index is used to retrieve the data chunk and the error-correcting data chunk corresponding to the data chunk, the data object index is used to retrieve the data object in the data chunk, and each data object index is used to retrieve a unique data object.

A data chunk encoding method in this step is the same as the encoding method used in the data management method 200. For specific implementation details, refer to corresponding parts of the data management method 200. However, this step is completed by the backup site 170. Therefore, an operation of constructing the data chunk association index and the data object index in the storage site 130 does not need to be considered.

According to the data management method in the present invention, after the plurality of data objects are integrated in the data chunk of the predetermined size, an encoding and backup operation is performed on the plurality of data objects. Therefore, the encoding and backup operation can be effectively used to advantage, a redundancy rate is reduced, storage efficiency is greatly improved, and storage costs are reduced. In addition, data processing efficiency is also improved, and availability is improved.

Figure 5:
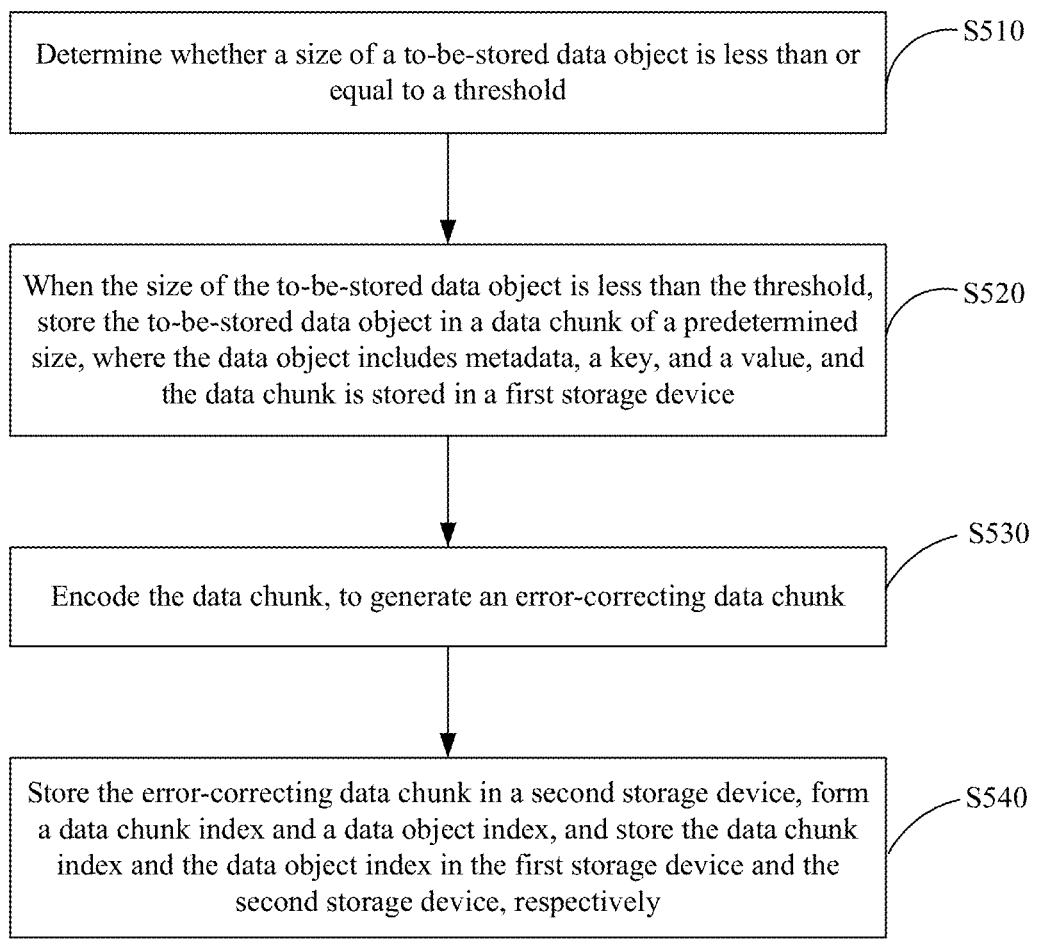
FIG. 5 is a schematic flowchart of a data management method according to another embodiment of the present invention.

With reference to FIG. 5, the present invention further provides a data management method 500, including the following steps:

S510. Determine whether a size of a to-be-stored data object is less than or equal to a threshold.

S520. When the size of the to-be-stored data object is less than the threshold, store the to-be-stored data object in a data chunk of a predetermined size (size/volume/capacity), where the data object includes metadata, a key, and a value, and the data chunk is stored in a first storage device.

S530. Encode the data chunk, to generate an error-correcting data chunk.

S540. Store the error-correcting data chunk in a second storage device, form a data chunk index and a data object index, and store the data chunk index and the data object index in the first storage device and the second storage device, respectively, where the data chunk index is used to retrieve the data chunk and the error-correcting data chunk corresponding to the data chunk, the data object index is used to retrieve the data object in the data chunk, each data object index is used to retrieve a unique data object, and the second storage device is different from the first storage device.

In the present invention, a main objective is to use an encoding technology to effectively store data objects in an application scenario in which sizes of these current data objects are relatively small, and to provide an effective fault tolerance/error correction capability. Therefore, some large data objects can be filtered out by determining whether sizes of the to-be-stored data objects are less than the threshold, and the objective of the present invention can be achieved better. As described in the background, according to statistics, currently, 40% of data is small data, and people are also aware that remaining 60% of data is big data. Therefore, an appropriate encoding/storage method is used for to-be-stored data whose size is greater than a preset threshold, and the method in this embodiment is used for small data, that is, small data whose size is less than the threshold. This can effectively improve overall data storage efficiency and increase a data processing speed. Step S520 to step S540 of the data management method 500 in this embodiment are the same as S210 to S230 of the data management method 200. For details, refer to descriptions in S210 to S230 in this specification. A possible implementation and a characteristic of S210 to S230 are the same as those of S520 to S540. Therefore, this embodiment has all functions and corresponding beneficial effects that are provided in the data management method 200 in the foregoing embodiment. In addition, this solution can further improve data storage efficiency. The threshold may be preset, for example, to 15 KB, 50 KB, or 100 KB. In addition, the threshold may be dynamically set based on an average size of stored data objects detected in a time period. For example, in one hour, an average size of to-be-stored data objects is 10.8 KB, and the threshold may be set to 11 KB. In addition, this embodiment may further include an encoding manner the same as that of encoding the data chunk, to encode a to-be-stored data object whose size is greater than the threshold, and generate a corresponding error-correcting data object and index. Another known storage manner, for example, a full duplication manner, may be further used to store the to-be-stored data object whose size is greater than the threshold. This is not limited to the methods in the present invention.

Figure 6:
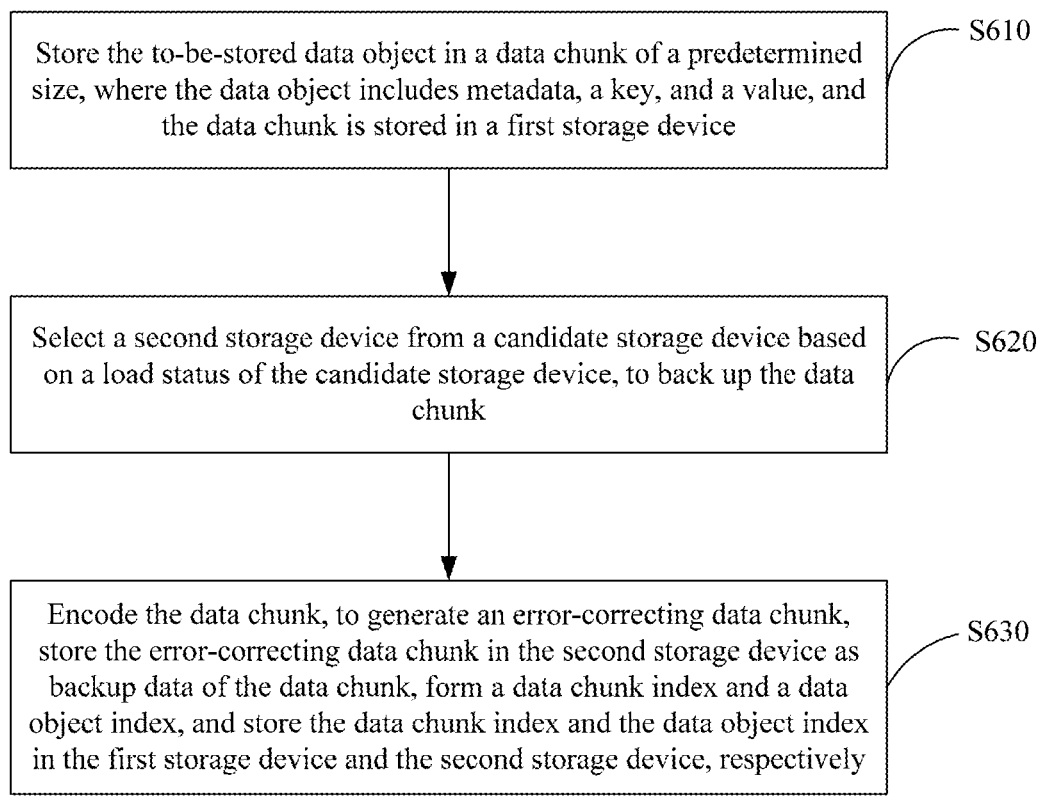
FIG. 6 is a schematic flowchart of a data management method according to another embodiment of the present invention.

With reference to FIG. 6, the present invention further provides a data management method 600, including the following steps:

S610. Store the to-be-stored data object in a data chunk of a predetermined size (size/volume/capacity), where the data object includes metadata, a key, and a value, and the data chunk is stored in a first storage device.

S620. Select a second storage device from a candidate storage device based on a load status of the candidate storage device, to back up the data chunk.

S630. Encode the data chunk, to generate an error-correcting data chunk, store the error-correcting data chunk in the second storage device as backup data of the data chunk, form a data chunk index and a data object index, and store the data chunk index and the data object index in the first storage device and the second storage device, respectively, where the data chunk index is used to retrieve the data chunk and the error-correcting data chunk corresponding to the data chunk, the data object index is used to retrieve the data object in the data chunk, and each data object index is used to retrieve a unique data object.

A main difference between the data management method provided in this embodiment and the foregoing data management method 200, 300, 400, or 500 lies in that the second storage device configured to store the error-correcting data chunk is selected based on a load status of a device. In a data storage process, especially in a process of storing an error-correcting data chunk, workload of a write operation is several times as much as workload of a write operation of storing the data chunk. To balance load of storage devices (a storage site 130 and a backup site 170) in a whole storage system, in the present invention, the storage devices may be dynamically adjusted based on load statuses of the storage devices. To be specific, a plurality of groups of different storage device combinations that are used to store a stripe list of the data chunk and the error-correcting data chunk, described in the data management methods 200 and 300 in the present invention, and indicated by a stripe list ID are adjusted in an iterative manner by using an algorithm. In this solution, a load status of the current storage device is considered only when the second storage device is selected. However, it may be understood that, when the first storage device is selected, a load status of the current device may also be considered to select a corresponding proper storage device, so as to balance load.

A specific implementation may be as follows: Use M storage devices with minimum load and minimum workload of the storage devices as the second storage devices (corresponding to the backup site 170), to store the error-correcting data chunk; select K storage devices with minimum workload of remaining storage devices as the first storage devices (corresponding to the storage site 130), to store the data chunk, where the M+K storage devices form an $i^{th}$ stripe list of stripe lists; and perform iteration according to this rule, until a stripe list meeting a preset requirement is constructed. It may be understood that, in this solution, the M+K storage devices are different for an $i^{th}$ strip; in other words, the M+K devices are not reused for the $i^{th}$ strip. Then, L devices of the M+K devices may be reused for an $(i+n)^{th}$ stripe. The L devices may be several backup sites of M backup sites included in the $i^{th}$ stripe, or may be several storage sites of K storage sites included in the $i^{th}$ stripe, or may be a combination of backup sites and storage sites included in several $i^{th}$ stripes. When the $(i+n)^{th}$ stripe is constructed, all candidate storage devices are re-sequenced based on respective load. If a storage device included in the $i^{th}$ stripe has already performed workload weighting calculation based on a role of the storage device, that is, a storage site or a backup site, all the candidate storage devices are added to a candidate storage device set again for selection, to construct the $(i+n)^{th}$ stripe. Weighting is separately performed by one unit of workload on storage devices that are in the $i^{th}$ stripe and that serve as storage sites, and weighting is separately performed by K units of workload on storage devices that are in the $i^{th}$ stripe and that serve as backup sites, where K is a quantity of storage sites in each stripe. Initial workload of the storage devices may be set to 0, and the initial workload is workload of a storage device not included in any stripe.

The method not only has functions and beneficial effects that are provided in the foregoing data management methods 200 to 400, but a storage device storing the data chunk and the error-correcting data chunk may also be dynamically constructed based on a load status of a device, thereby balancing load, and improving storage efficiency during data storage.

The following describes in detail, by using a distributed storage system 100 as an example, four basic operations, that is, a SET operation, a GET operation, an UPDATE operation, and a DELETE operation, for implementing a data storage process according to the data management methods 200, 300, 400, 500, and 600 of the present invention.

Set Operation:

The Set operation is newly inserting a data object into the storage system 100. The operation basically includes the following steps:

(a) First, a client 110 selects one storage site 130 and a plurality of backup sites 170.

The storage site and the backup sites belong to a same stripe (stripe). In other words, the backup sites 170 are sites associated with the storage site 130, and the backup sites 170 and the storage site 130 have a same stripe ID. Then, the client 110 separately sends a SET request to the storage site 130 and the backup sites 170. The storage site and the backup sites 170 each return an acknowledgement message. Based on the acknowledgement message, the client 110 may know whether each site becomes faulty, and may also know whether a data chunk stored in the selected storage site still has enough space to store a new data object. If a new data object can still be stored in the data chunk in the selected storage site 130, the following steps are performed:

(b) The client 110 concurrently (simultaneously) sends a to-be-stored data object to the selected storage site 130 and the selected plurality of backup sites 170.

(c) The storage site 130 stores the received data object in a data chunk (Data Chunk) that is not encapsulated, and the backup site 170 stores the new data object in a temporary buffer.

(d) The storage site 130 adds a data object index corresponding to the new data object to a data object index stored in the storage site 130.

(e) When data objects (including data objects that are historically stored and newly added) that are stored in the data chunk in the storage site 130 approximate a storage limit of the data chunk, the storage site 130 encapsulates the data chunk, and sends a key (Key) list of all data objects stored in the encapsulated data chunk to the backup site 170 related to the storage site 130, namely, the backup site 170 in the same stripe.

(f) After receiving the key list sent by the storage site 130, the backup site 170 retrieves a corresponding data object from the temporary buffer based on a key in the key list, reconstructs a data chunk corresponding to the key list in the storage site 130, calculates a corresponding backup data chunk based on the reconstructed data chunk, updates, based on the backup data chunk, a backup data chunk that is in the backup site 170 and that corresponds to the encapsulated data chunk in the storage site, removes related buffer data in the buffer, and updates a data object index in the backup site 170.

Get Operation:

The Get operation is querying, based on a key value of the data object, a Value value corresponding to the key value.

The client 110 finds, based on the key value of the data object and by using an index part 310 of a data model in the method in the present invention, the corresponding storage site that stores the data object corresponding to the key. Then, the Value value corresponding to the key is found based on the data object index stored in the storage site, and the value is returned to the client 110.

Update Operation:

The Update operation is updating the Value value based on the key value of the data object, and may mainly include the following steps:

(a) The client 110 finds, based on the key of the data object and by using the index part 310 of the data model in the method in the present invention, the storage site 130 that stores the data object corresponding to the key, and sends a to-be-updated value value to the storage site 130.

(b) The storage site 130 updates the value value corresponding to the key, and sends the update to all storage apparatuses, namely, the backup sites, that store an error-correcting data chunk corresponding to the data chunk in which the data object is stored.

(c) If the data chunk in which the updated data object is located is not encapsulated, the backup site needs to update only a value of the corresponding data object in the buffer of the backup site.

(d) If the data chunk in which the updated data object is located is already encapsulated, the backup site needs to calculate a new error-correcting data chunk based on the updated value of the data object, and use the new error-correcting data chunk to replace the original old error-correcting data chunk corresponding to the data chunk.

(e) After the update is completed, the storage site returns modification success acknowledgement information to the client.

Delete Operation:

The Delete operation is deleting a data object from the storage site, and mainly includes the following steps:

(a) The client 110 finds, based on a key value of the data object and by using the index part 310 of the data model in the method in the present invention, the storage site 130 that stores the data object corresponding to the key, and sends a delete request to the storage site.

(b) If a data chunk in which the to-be-deleted data object is located is not encapsulated, the storage site 130 deletes the data object in the data chunk, and sends, to a parity server, to delete the corresponding object in a buffer.

(c) If the data chunk in which the to-be-deleted data object is located is already encapsulated, the storage site 130 sets a value of the data object to a special value, for example, 0, uses the special value as a delete identifier, and sends the special value to the corresponding backup site 170 in a manner similar to the Update operation; the backup site updates a corresponding error-correcting data chunk in a manner similar to the update operation; and when the storage site 130 is idle, the storage site 130 really removes these data objects having the special value.

(d) After the backup site 170 completes the update, the storage site 130 returns deletion success acknowledgement information.

The following describes how a distributed storage system ensures normal processing of a service request and timely fault recovery after a site that is in the distributed storage system 100 and that uses the data management methods in the present invention, for example, a storage site 130, becomes faulty.

First, referring to FIG. 7, several states of the distributed storage system 100 in a faulty period are briefly described. The faulty period herein is a time period from a time when a fault occurs on a first target site requested by a client 110 to a time when the fault is cleared and the faulty first target site is restored and operates normally. Four states of the distributed system 100 in the faulty period are a normal state (Normal state), an intermediate state (Intermediate state), a degrade state (Degrade state), and a coordinator normal state (Coordinator normal state). Specific definitions are as follows:

Normal State: Normal State

In the intermediate state, it is detected that a site (a storage site 130 or a backup site 170) in the system is faulty and data inconsistency has occurred and not been overcome. When the site in the system becomes faulty, a data inconsistency problem may arise, causing data inconsistency. A cause of the problem is as follows: When updating data information, a requested storage site sends the updated data information to corresponding backup sites to update backed-up data information. However, the storage site becomes faulty after sending the updated data information to the corresponding backup sites. Before a fault occurs, the storage site may already receive acknowledgement messages of some backup sites that complete updating of backed-up data information, but does not receive acknowledgement messages of updating data information of other backup sites. As a result, the system does not know whether all backup sites corresponding to the faulty storage site complete updating of data information, and data inconsistency may occur in a plurality of backup sites corresponding to the same storage site.

In the degrade state, the data inconsistency problem is already resolved, and a service request is still undertaken by a coordinator.

In the coordinator normal state, a faulty server is already restored, and a data change in a restoration period is migrated to the restored server; and all requests are still undertaken by the coordinator in a migration period.

When a site, for example, the storage site 130 or the backup site 170 (for brevity, the storage site 130 or the backup site 170 is referred to as a site for short in the following) becomes faulty, the coordinator manager 150 uses a reliability mechanism, such as an atomic broadcast and a like technology, and notifies each client 110 that the site in the distributed storage system 100, that is, the storage site 130 and/or the backup site 170, becomes faulty. When the faulty site is currently in the intermediate state, the distributed storage system 100 needs to have a capability to overcome data inconsistency between sites. In the present invention, an example of a method for eliminating the data inconsistency between sites is as follows: A client 110 locally backs up a service request initiated by the client 110. In other words, the client 110 temporarily stores the service request sent by the client 110 in a buffer of the client 110. If the client 110 receives acknowledgement information of the request, to be specific, after data information in each storage site and backup site is consistent, and if the client 110 receives an acknowledgement message from each site, the client 110 deletes the service request that is in the buffer of the client 110 and of which the corresponding acknowledgement message is already received. If no acknowledgement message is received for a service request of the client 110, in other words, when data information inconsistency between sites has not been overcome, the client 110 continues to send the same service request, until acknowledgement information is received. In other words, data information in the sites becomes consistent. In addition, the client 110 also needs to buffer a correspondence between a key of a data object in a service request and each site. The correspondence is attached at an end of an acknowledgement message of the service request when each site returns the acknowledgement message. The correspondence between a key and a site mainly includes two hash maps (hash map). One hash map is a mapping relationship between a key of a data object and a stripe list, and the other hash map is a mapping relationship between a key of a data object and a location of the data object, to which the key belongs, in the stripe list. By using the two hash maps, a corresponding site may be found based on a key. In other words, the storage site 130 and the backup site 170 may also be referred to as a data server (data server) and a parity server (parity server) or a first storage location and a second storage location, respectively. The two hash maps are refreshed when the client 110 receives the acknowledgement information of the service request, or refreshed after the faulty site is restored or the faulty site is replaced by a new site. A main objective of storing, by the client 110, the correspondence between a key of a data object and a site is that, when a requested site becomes faulty, the client may send a stored latest correspondence between a key of a data object and a site to the coordinator manager 150. The coordinator manager 150 may reconstruct, in the faulty site, a correspondence between a key of a data object and a site based on the correspondence between a key of a data object and a site, so that when data of the faulty site is reconstructed, the coordinator manager 150 can still process a service request from each client based on the correspondence, reconstructed in the faulty site, between a key of a data object and a site.

After the data inconsistency problem is resolved, the coordinator manager 150 specifies a normal site in a same stripe including the faulty site, to temporarily replace the faulty site. The site used as a replacement is referred to as a redirected site (redirected site), and the redirected site replaces the faulty site to process a new service request from the client. Usually, a specific form of the site is a server. Therefore, the redirected site may also be referred to as a redirected server. After the faulty site is replaced by the redirected site, the distributed storage system enters the degraded state.

Before the faulty site is restored or the fault is cleared, to be specific, when the system is in the degraded state, a request sent by each client 110 to the faulty site is forwarded by the coordinator manager 150 to the redirected site, and the redirected site temporarily processes all requests with respect to the faulty site in a fault recovery period, and buffers all data modification records.

After the fault of the faulty site is cleared, the redirected site migrates the buffered modification records to the faulty site that is already restored. It should be noted that after the faulty site is restored but before data migration is completed, all service requests from clients are still processed by the redirected site. After the redirected site completes migration of all reconstructed data, the system is restored to the normal state, the coordinator manager 150 no longer undertakes a service request, and the client 110 can normally send a service request to each site in the distributed system 100.

If the fault of the faulty site is a permanent fault, in other words, if normal operation cannot be restored in a period of time, the coordinator manager 150 uses, in a period when the redirected site replaces the faulty site, data in another site that operates normally and that is located in a same stripe as the faulty site, to restore data in the faulty site to a new site. After the data of the faulty site is restored to the new site, to be specific, after reconstructing the data in the faulty site in the new site is completed, the redirected site sends the buffered data modification record to the new site, and the new site updates the restored/reconstructed data based on the data modification record sent by the redirected site, so that the updated reconstruction data information is consistent with data information in the another site that is located in the same stripe as the faulty site. The coordinator manager 150 sends new site information to each client. The client re-updates a correspondence between a key and a site in the buffer, updates index information maintained in each site, and adds the new site information to the stripe in which the faulty site is located. In other words, the new site is provided with a stripe ID the same as that of the faulty site. Then, the coordinator manager 150 no longer undertakes a service request, and the system is restored to the normal state.

The following describes how a distributed storage system 100 to which the data management methods in the present invention are applied processes a service request from a client 110 in a degrade state phase. In a degraded state, the service request from the client 110 is described by using four basic operations: degraded Set, degraded GET, degraded Update, and degraded Delete.

Degraded Set Operation:

The degraded Set operation is inserting a data object into a data chunk in a storage site in the storage system 100 when a requested site in the distributed storage system 100 is in a faulty state. The operation basically includes the following steps:

When determining that a site processing a set request is in a faulty state, the client 110 sends a service request to a coordinator; and the client 110 may determine, by using broadcast of the coordinator manager 150, that the site processing the SET request is in the faulty state, or deduce that the site processing the SET request is in the faulty state if there is no acknowledgement after the Set request is sent a limited quantity of times.

The coordinator manager 150 specifies another site that is in a stripe in which the faulty site is located and that operates normally as a redirected site, where the redirected site may also be referred to as a temporary storage site, and sends information about the redirected site to the client 110.

The client 110 receives the information about the redirected site, and sends the set request to the redirected site.

The redirected site buffers the set request, and returns acknowledgement information.

The client 110 buffers the information about the redirected site, and then sends, to the redirected site, all information sent to the faulty site.

After the faulty site is restored, the redirected site migrates the buffered Set request to the restored site; and the restored site processes the Set request in a manner according to the Set operation in the foregoing normal state in this specification.

Degraded GET Operation:

The degraded Get operation is querying, based on a key value of the data object, a Value value of the data object corresponding to the key value when the requested site in the distributed storage system 100 is in the faulty state.

When determining that a site processing a Get request is in a faulty state, the client 110 sends a service request to the coordinator; and the client 110 may determine, by using broadcast of the coordinator manager 150, that the site processing the Get request is in the faulty state, or deduce that the site processing the Get request is in the faulty state if there is no acknowledgement after the Get request is sent a limited quantity of times.

The coordinator manager 150 specifies another site that is in a stripe in which the faulty site is located and that operates normally as a redirected site, and sends information about the redirected site to the client 110.

The client 110 receives the information about the redirected site, and sends the Get request to the redirected site.

If a data chunk (data chunk) in which a data object requested by the Get request is located is not encapsulated, requested data may be directly returned from a buffer of a backup site included in the stripe in which the faulty site is located. According to the foregoing data management methods described in the present invention, if the requested data chunk is not encapsulated, the requested data is temporarily stored in the buffer of the backup site. Therefore, when the Get request is processed, this characteristic may be used, to directly obtain the requested data from the backup site.

If the data object requested by the Get request is newly added or modified after the faulty site becomes faulty, corresponding data can be directly obtained from a buffer of the redirected site. It can be learned from the foregoing degraded Set operation that, when the system is in a degraded state, the redirected site replaces the faulty site, and data objects carried in all Set requests are buffered in the buffer of the redirected site. Therefore, if the data requested by the Get request is newly added based on a degrade Set request when the system is in the degrade state, the corresponding data object may be directly obtained from the buffer of the redirected site based on the Get request and the key.

In addition to the foregoing two cases, the redirected site uses data in a site in the same stripe to restore the data chunk in which the data object requested by the Get request is located, and returns the data object corresponding to the Get request. In this process, to avoid restoring data objects of the whole data chunk a plurality of times, the redirected site buffers the restored data chunk.

After receiving acknowledgement information returned by the redirected site, the client refreshes the buffer, to be specific, deletes the buffered degraded Get request in the buffer.

Degraded UPDATE and Degraded DELETE Operations:

The degraded Update operation is updating a Value value based on a key value of a data object when the requested site in the distributed storage system 100 is in the faulty state.

The degraded Delete operation is deleting a data object from the storage site when the requested site in the distributed storage system 100 is in the faulty state.

The degraded Update operation is similar to the degraded DELETE operation. The following steps are mainly included:

When determining that a site processing an Update/Delete request is in a faulty state, the client 110 sends a service request to the coordinator; and the client 110 may determine, by using broadcast of the coordinator manager 150, that the site processing the Update/Delete request is in the faulty state, or deduce that the site processing the Update/Delete request is in the faulty state if there is no acknowledgement after the Update/Delete request is sent a limited quantity of times.

The coordinator manager 150 specifies another site that is in a stripe in which the faulty site is located and that operates normally as a redirected site, and sends information about the redirected site to the client 110.

The client 110 receives the information about the redirected site, and sends the Update/Delete request to the redirected site.

The redirected site restores a data chunk in the faulty site based on data in the another site in the same stripe, modifies a data object in the data chunk based on the Update/Delete request, and synchronously modifies data in the backup site.

After receiving Update/Delete request complete acknowledgement information sent by the redirected site, the client refreshes the buffer.

After the faulty site is restored, the redirected site migrates the Update/Delete request in the buffer to the restored site. The restored site processes the Update/Delete request in a manner according to the Update/Delete operation in the foregoing normal state in this specification.

The distributed storage system 100 using the data management methods in the present invention can implement various service requests for data objects in a data chunk in the foregoing operation manners, and when a site becomes faulty, data in the faulty site is restored without affecting a normal service request. This effectively indicates feasibility and reliability of using the data management methods in the present invention to store a small data object in the distributed storage system 100 in a manner of a data chunk of a constant size.

Based on the foregoing specific implementations, with reference to FIG. 7A to FIG. 7H, in the present invention, the data management methods may be applied in a wider-application scenario by using examples and the following method. Therefore, with reference to FIG. 7A, an embodiment of the present invention further provides a data management method 700. The data management method includes the following steps:

S7-10. Select one storage site and a plurality of backup sites for a to-be-stored data object, where the storage site and the plurality of backup sites have a same stripe list ID.

S7-20. Send the to-be-stored data object to the storage site and the plurality of backup sites, where the data object includes metadata, a key, and a value.

S7-30. In the storage site, store the to-be-stored data object in a data chunk that has a constant size and that is not encapsulated, add data index information of the to-be-stored data object to a data index, where the data index includes data index information of all data objects in the data chunk, and generate a data chunk index.

S7-40. In the backup site, store the to-be-stored data object in a temporary buffer.

S7-50. After the to-be-stored data object is stored in the data chunk, if a total data size of all the data objects stored in the data chunk approximates a storage limit of the data chunk, encapsulate the data chunk, send a key list of all the data objects stored in the encapsulated data chunk to the backup site, and generate a same stripe ID for the storage site and the backup site.

S7-60. After receiving the key list, the backup site retrieves, from the temporary buffer based on a key in the key list, a data object corresponding to the key, reconstructs, based on the data object, a data chunk corresponding to the key list, and encodes the reconstructed data chunk, to obtain a backup data chunk.

S7-70. Update the data chunk index and the data object index that is stored in the backup site and that corresponds to the encapsulated data chunk.

In the method, a plurality of data objects are gathered in one data chunk and are encoded in a centralized manner. In this way, data encoding and backup can be effectively used to advantage. In other words, data redundancy is relatively low. This avoids disadvantages of low efficiency and high system redundancy that are caused by independent encoding and backing up of each data object. It should be noted that in the method, the storage site and the backup site are usually disposed at different locations in a distributed storage system, to provide a required redundancy capability. In other words, when a storage site becomes faulty, content in the storage site can be restored by using a backup site. In addition, in the method, a data storage method may include one or more of the following methods: (1) When the data chunk includes the plurality of data objects, the method further includes: determining whether a size of a to-bestored data object is less than a threshold, and using the to-be-stored data object whose size is less than the threshold as a data object that can be stored in the data chunk for storage and encoding; (2) dynamically adjusting the threshold at a predetermined time interval based on an average size of the to-be-stored data object; (3) when the distributed storage system includes a plurality of candidate storage devices, using one or more candidate storage devices with minimum load as the one or more second storage devices based on load statuses of the plurality of candidate storage devices; and (4) when a size of the data object is greater than a size of storage space in the data chunk, or when the size of the data object is greater than a size of remaining storage space in the data chunk, segmenting the data object, storing, in the data chunk, a segmented data object whose size after the segmentation is less than the size of the storage space in the data chunk or less than the size of the remaining storage space in the data chunk, and storing data chunk segmentation information in metadata of the segmented data object, to recombine the segmented data object.

Figure 7A:
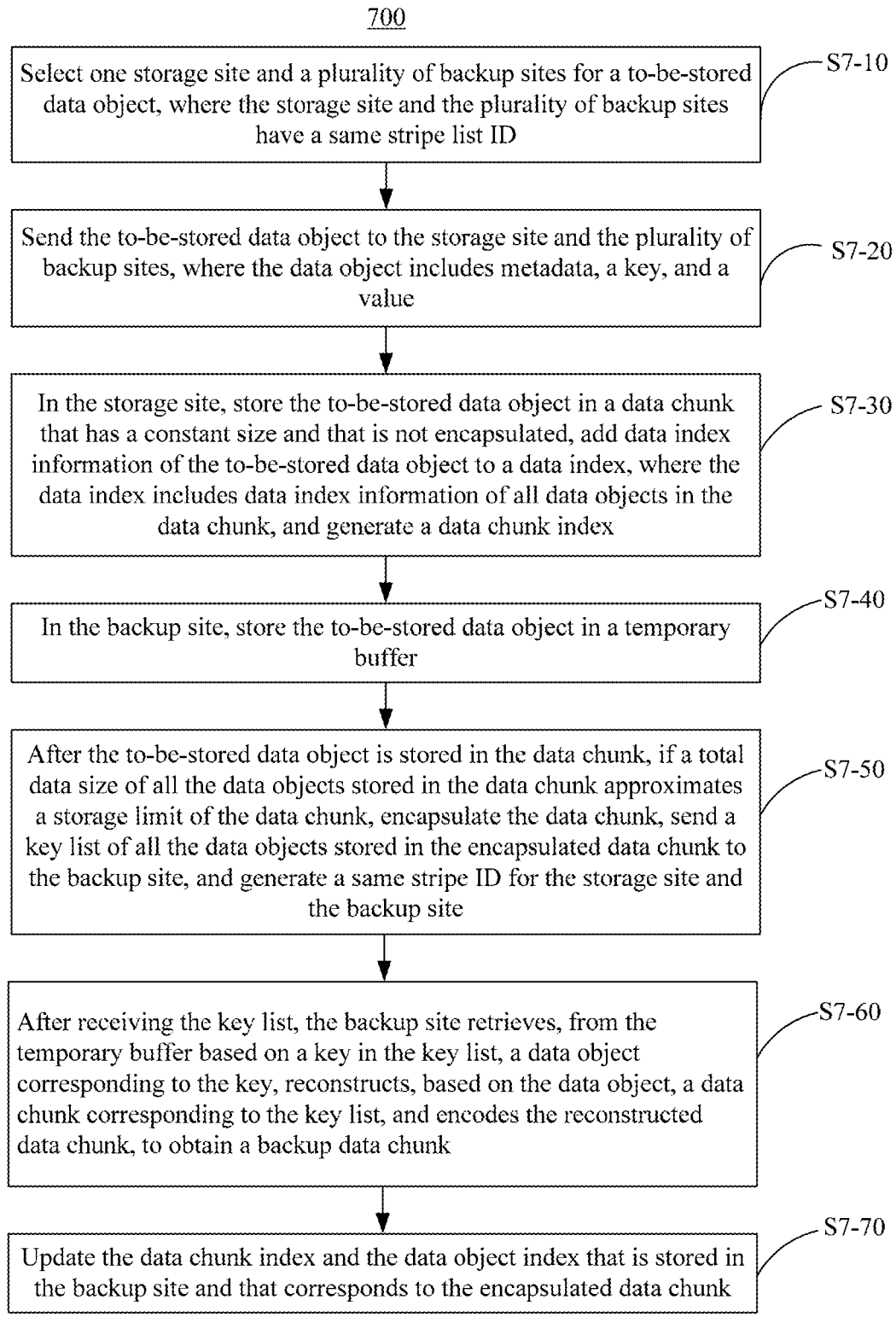
Figure 7B:
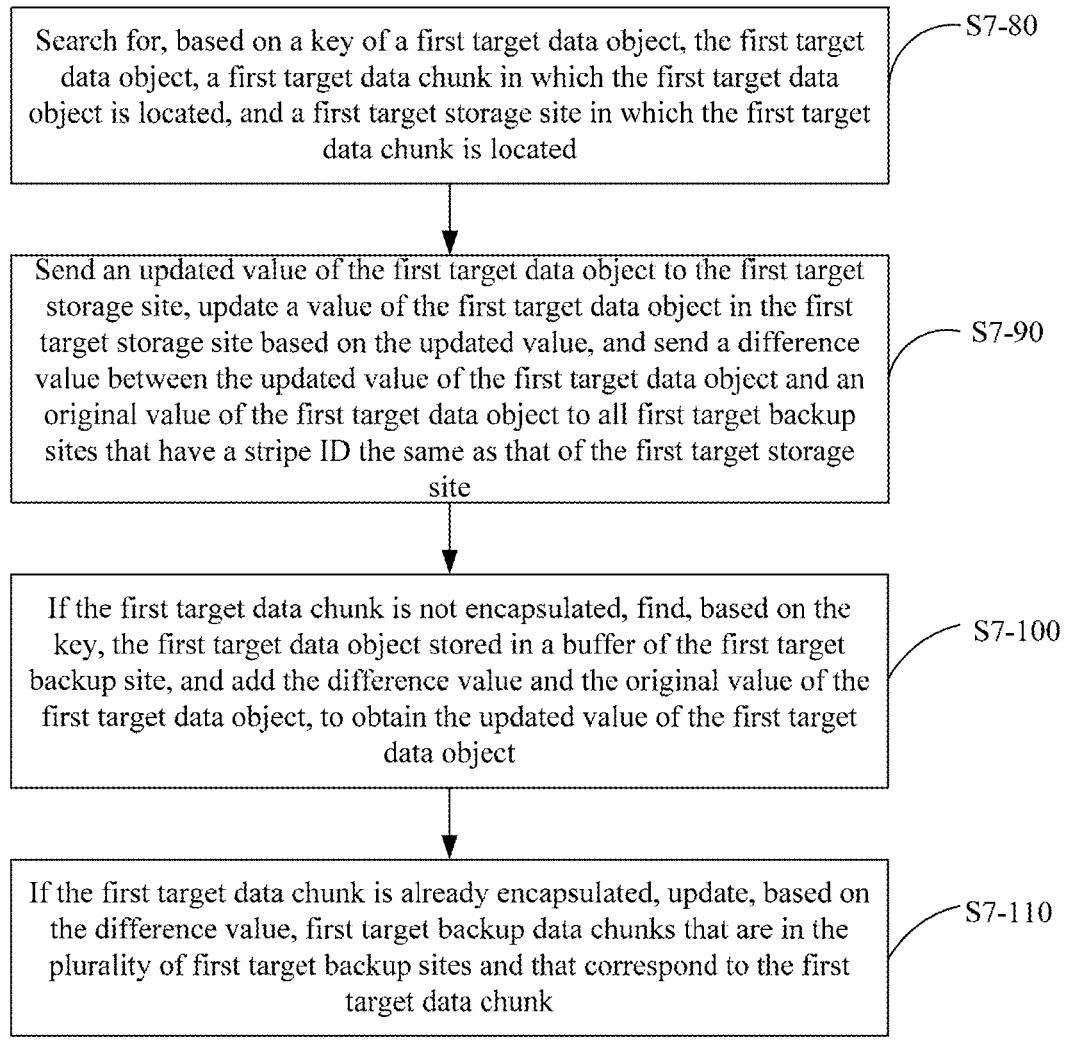

With reference to FIG. 7B, the data management method 700 in the present invention may further include the following steps:

S7-80. Search for, based on a key of a first target data object, the first target data object, a first target data chunk in which the first target data object is located, and a first target storage site in which the first target data chunk is located.

S7-90. Send an updated value of the first target data object to the first target storage site, update a value of the first target data object in the first target storage site based on the updated value, and send a difference value between the updated value of the first target data object and an original value of the first target data object to all first target backup sites that have a stripe ID the same as that of the first target storage site.

S7-100. If the first target data chunk is not encapsulated, find, based on the key, the first target data object stored in a buffer of the first target backup site, and add the difference value and the original value of the first target data object, to obtain the updated value of the first target data object.

S7-110. If the first target data chunk is already encapsulated, update, based on the difference value, first target backup data chunks that are in the plurality of first target backup sites and that correspond to the first target data chunk.

In the method, flexible modification and update of the data object stored in the data chunk of a constant size are allowed. It should be noted that S7-80 to S7-110 in the method do not need to depend on S7-10 to S7-70 in the method. To be specific, S7-80 to S7-110 in the method may be separated from S7-10 to S7-70 in the method, to be implemented as an independent data object modification method. A data structure to which this independent data object modification method is applicable may be the data structure disclosed in FIG. 3 of the present invention.

Figure 7C:
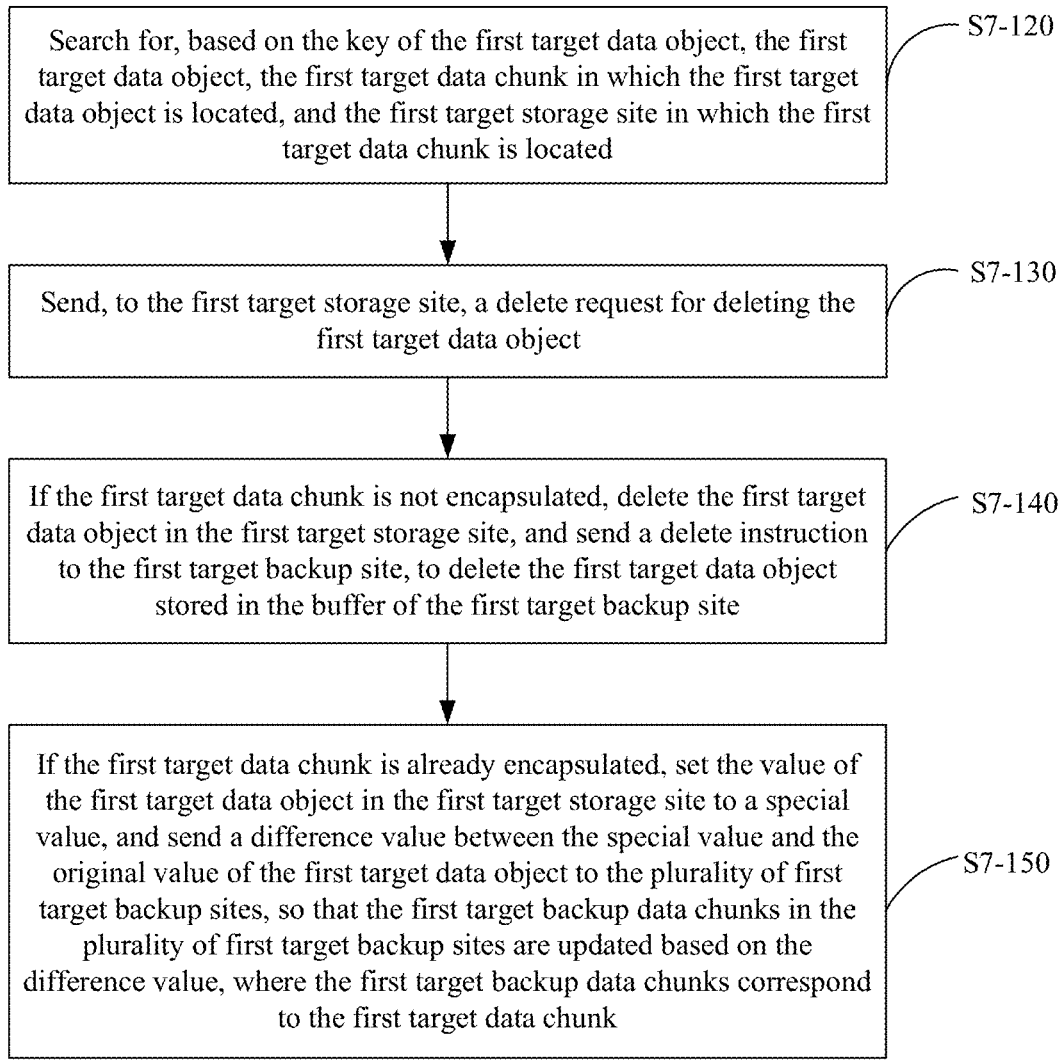

With reference to FIG. 7C, the data management method 700 in the present invention may further include the following steps:

S7-120. Search for, based on the key of the first target data object, the first target data object, the first target data chunk in which the first target data object is located, and the first target storage site in which the first target data chunk is located.

S7-130. Send, to the first target storage site, a delete request for deleting the first target data object.

S7-140. If the first target data chunk is not encapsulated, delete the first target data object in the first target storage site, and send a delete instruction to the first target backup site, to delete the first target data object stored in the buffer of the first target backup site.

S7-150. If the first target data chunk is already encapsulated, set the value of the first target data object in the first target storage site to a special value, and send a difference value between the special value and the original value of the first target data object to the plurality of first target backup sites, so that the first target backup data chunks in the plurality of first target backup sites are updated based on the difference value, where the first target backup data chunks correspond to the first target data chunk.

In the method, a data deletion method that can reduce system load is provided. To be specific, a target data object stored in the data chunk is not deleted immediately; instead, a value of the target data object is set to a special value, for example, 0, and the target data object may be deleted when the system is idle. It should be noted that S7-120 to S7-150 in the method do not need to depend on S7-10 to S7-110 in the method. To be specific, S7-120 to S7-150 in the method may be separated from S7-10 to S7-110 in the method, to be implemented as an independent data object deletion method. A data structure to which this independent data object deletion method is applicable may be the data structure disclosed in FIG. 3 of the present invention.

Figure 7D:
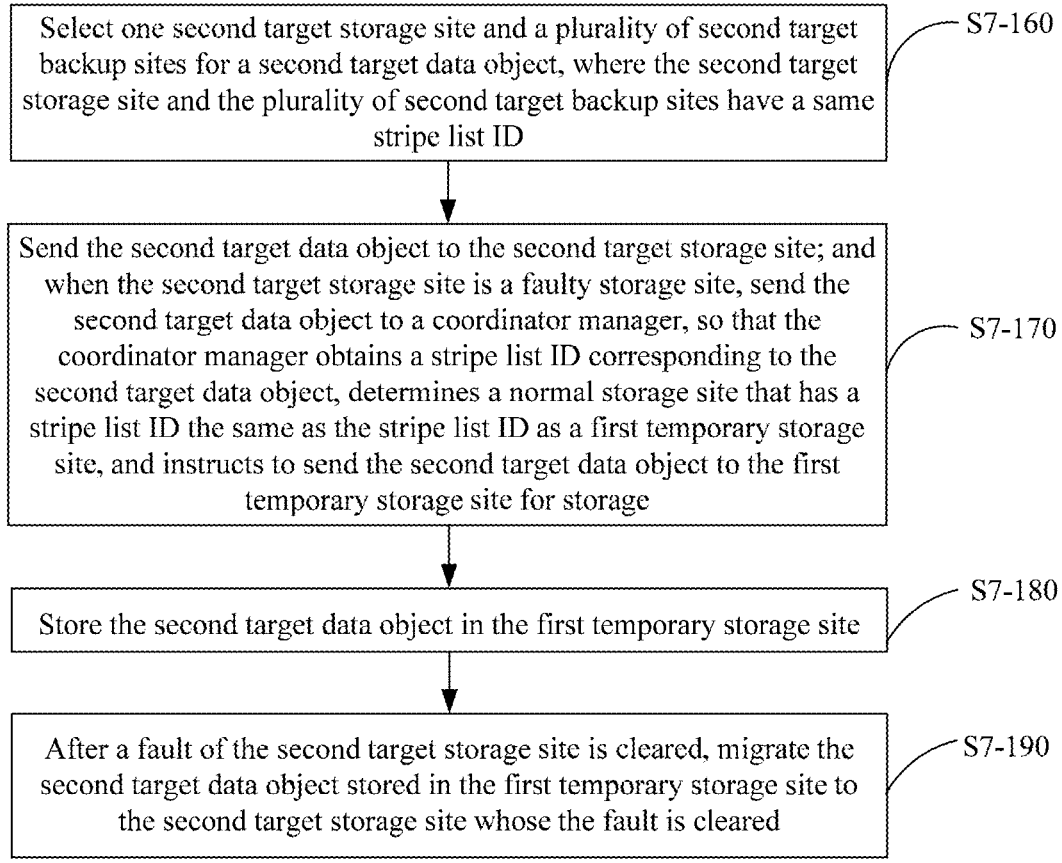
Figure 7E:
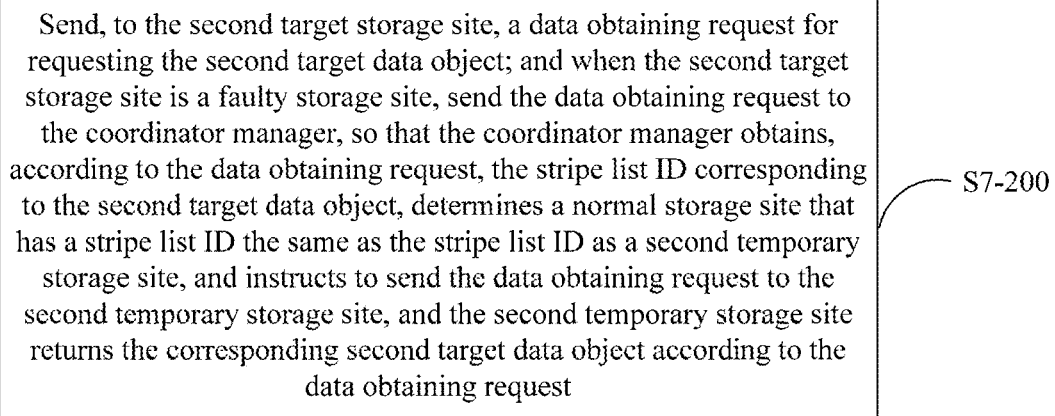
Figure 7F:
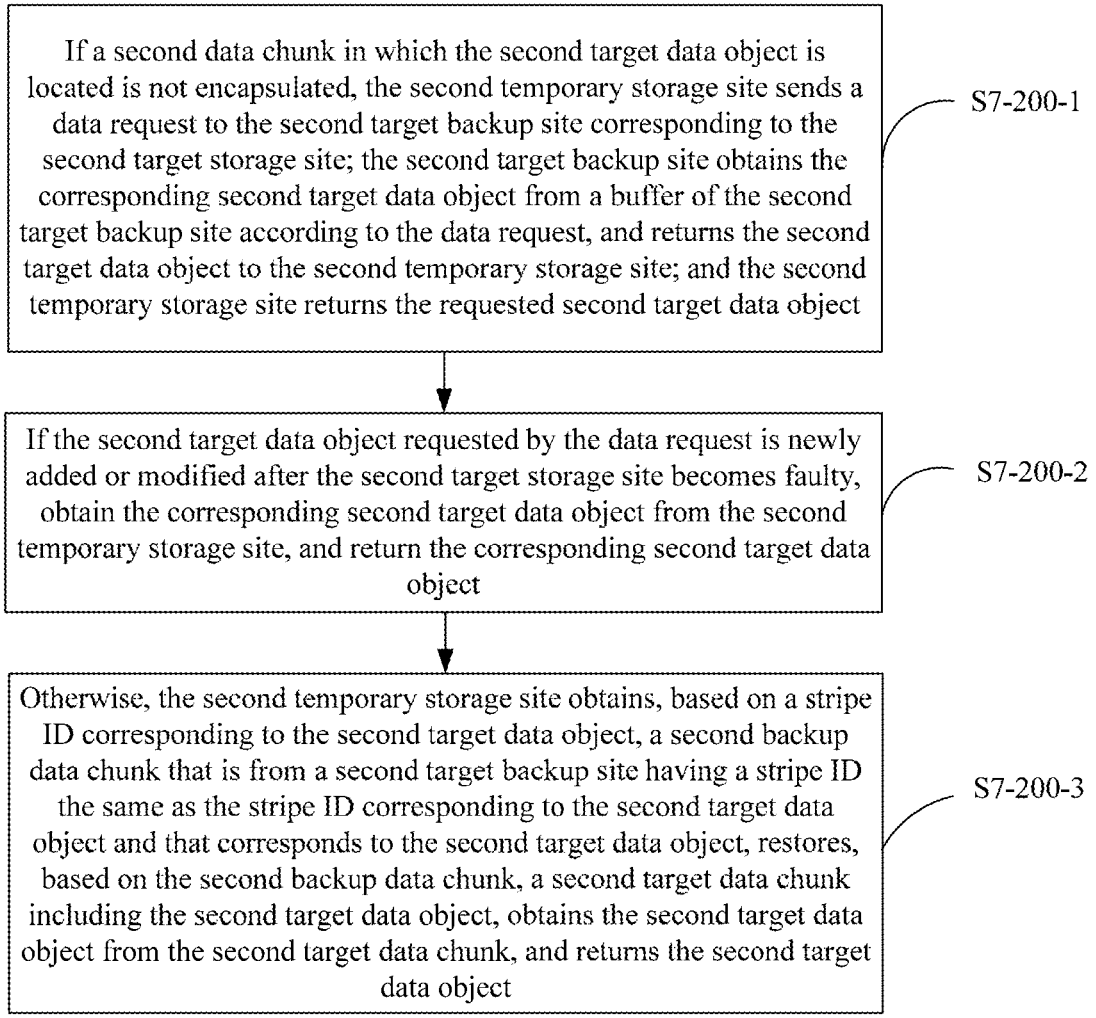

With reference to FIG. 7D, the data management method 700 in the present invention may further include the following steps:

S7-160. Select one second target storage site and a plurality of second target backup sites for a second target data object, where the second target storage site and the plurality of second target backup sites have a same stripe list ID.

S7-170. Send the second target data object to the second target storage site; and when the second target storage site is a faulty storage site, send the second target data object to a coordinator manager, so that the coordinator manager obtains a stripe list ID corresponding to the second target data object, determines a normal storage site that has a stripe list ID the same as the stripe list ID as a first temporary storage site, and instructs to send the second target data object to the first temporary storage site for storage.

S7-180. Store the second target data object in the first temporary storage site.

S7-190. After a fault of the second target storage site is cleared, migrate the second target data object stored in the first temporary storage site to the second target storage site whose fault is cleared.

The method ensures that, in the data management method, when a specified second target storage site becomes faulty, the coordinator manager specifies a first temporary storage site to take the place of the faulty second target storage site, and when the faulty second target storage site is restored, migrates, to the second target storage site, the second target data object that is stored in the first temporary storage site and that points to the second target storage site; and the second target storage site stores the second target data object according to a normal storage method. It should be noted that S7-170 to S7-190 in the method do not need to depend on S7-10 to S7-160 in the method. To be specific, S7-170 to S7-190 in the method may be separated from S7-10 to S7-160 in the method, to be implemented as an independent data setting method that is used in a faulty stage of the storage site. A data structure to which this independent data setting method used in the faulty stage is applicable may be the data structure disclosed in FIG. 3 of the present invention. The data management method 700 in the present invention may further include the following step:

S7-200. Send, to the second target storage site, a data obtaining request for requesting the second target data object; and when the second target storage site is a faulty storage site, send the data obtaining request to the coordinator manager, so that the coordinator manager obtains, according to the data obtaining request, the stripe list ID corresponding to the second target data object, determines a normal storage site that has a stripe list ID the same as the stripe list ID as a second temporary storage site, and instructs to send the data obtaining request to the second temporary storage site, and the second temporary storage site returns the corresponding second target data object according to the data obtaining request.

In the method, it can be ensured that, in this data management method, even if a second target storage site becomes faulty, a client can still be allowed to access a data object stored in the faulty second target storage site. A specific method is described as above, and the second temporary storage site takes the place of the second target storage site, to implement access to the faulty site. It should be noted that S7-200 in the method does not need to depend on S7-10 to S7-190 in the method. To be specific, S7-210 in the method may be separated from S7-10 to S7-190 in the method, to be implemented as an independent data requesting method that is used in a faulty stage of the storage site. A data structure to which this independent data requesting method used in the faulty stage is applicable may be the data structure disclosed in FIG. 3 of the present invention.

In step S7-200 of the data management method 700 in the present invention, a step of the returning, by the second temporary storage site, the corresponding second target data object according to the data obtaining request may further include the following steps:

S7-200-1. If a second data chunk in which the second target data object is located is not encapsulated, the second temporary storage site sends a data request to the second target backup site corresponding to the second target storage site; the second target backup site obtains the corresponding second target data object from a buffer of the second target backup site according to the data request, and returns the second target data object to the second temporary storage site; and the second temporary storage site returns the requested second target data object.

S7-200-2. If the second target data object requested by the data request is newly added or modified after the second target storage site becomes faulty, obtain the corresponding second target data object from the second temporary storage site, and return the corresponding second target data object.

S7-200-3. Otherwise, the second temporary storage site obtains, based on a stripe ID corresponding to the second target data object, a second backup data chunk that is from a second target backup site having a stripe ID the same as the stripe ID corresponding to the second target data object and that corresponds to the second target data object, restores, based on the second backup data chunk, a second target data chunk including the second target data object, obtains the second target data object from the second target data chunk, and returns the second target data object.

In the method, when a data storage site, for example, the second target storage site, becomes faulty, a fault occurrence time point and duration are uncertain. Therefore, the method provides methods for accessing data in the faulty site in a plurality of different cases, to improve system flexibility and applicability.

The data management method 700 in the present invention may further include the following step:

S7-210. Send, to a third target storage site, a data modification request for modifying a third target data object; and when the third target storage site is a faulty storage site, send the data modification request to the coordinator manager, so that the coordinator manager obtains a stripe list ID corresponding to the third target data object, determines a normal storage site that has a stripe list ID the same as the stripe list ID as a third temporary storage site, and instructs to send the data modification request to the third temporary storage site, and the third temporary storage site modifies the third target data object according to the data modification request.

In the method, it can be ensured that, in this data management method, even if a third target storage site becomes faulty, a client can still be allowed to access a data object stored in the faulty third target storage site. A specific method is described as above, and the third temporary storage site takes the place of the third target storage site, to modify data in the faulty site. It should be noted that S7-210 in the method does not need to depend on S7-10 to S7-200 in the method. To be specific, S7-210 in the method may be separated from S7-10 to S7-200 in the method, to be implemented as an independent data modification method that is used in a faulty stage of the storage site. A data structure to which this independent data modification method used in the faulty stage is applicable may be the data structure disclosed in FIG. 3 of the present invention.

In step S7-210 of the data management method 700 in the present invention, the modifying, by the third temporary storage site, the third target data object according to the data modification request may further include the following steps:

S7-210-1. Store the data modification request in the third temporary storage site, so that the third temporary storage site obtains, based on a stripe ID corresponding to the third target data object, a third backup data chunk that is from a third target backup site having a stripe ID the same as the stripe ID corresponding to the third target data object and that corresponds to the third target data object, restores, based on the third backup data chunk, a third target data chunk including the third target data object, and sends a difference value between an updated value carried in the data modification request and an original value of the third target data object to the third target backup site, and the third target backup site updates the third backup data chunk based on the difference value.

S7-210-2. After a fault of the third target storage site is cleared, migrate the data modification request stored in the third temporary storage site to the third target storage site, so that the third target storage site modifies the third target data object in the third target storage site according to the data modification request.

In the method, when the third target storage site becomes faulty, the third temporary storage site may process modification performed on the third target data object, keep data in the third target backup site consistent with the modified third target data object, and after the third target storage site is restored, re-send the modification request to the third target storage site, so that the data in the third target backup site is consistent with third target data in the third target storage site.

Figure 8:
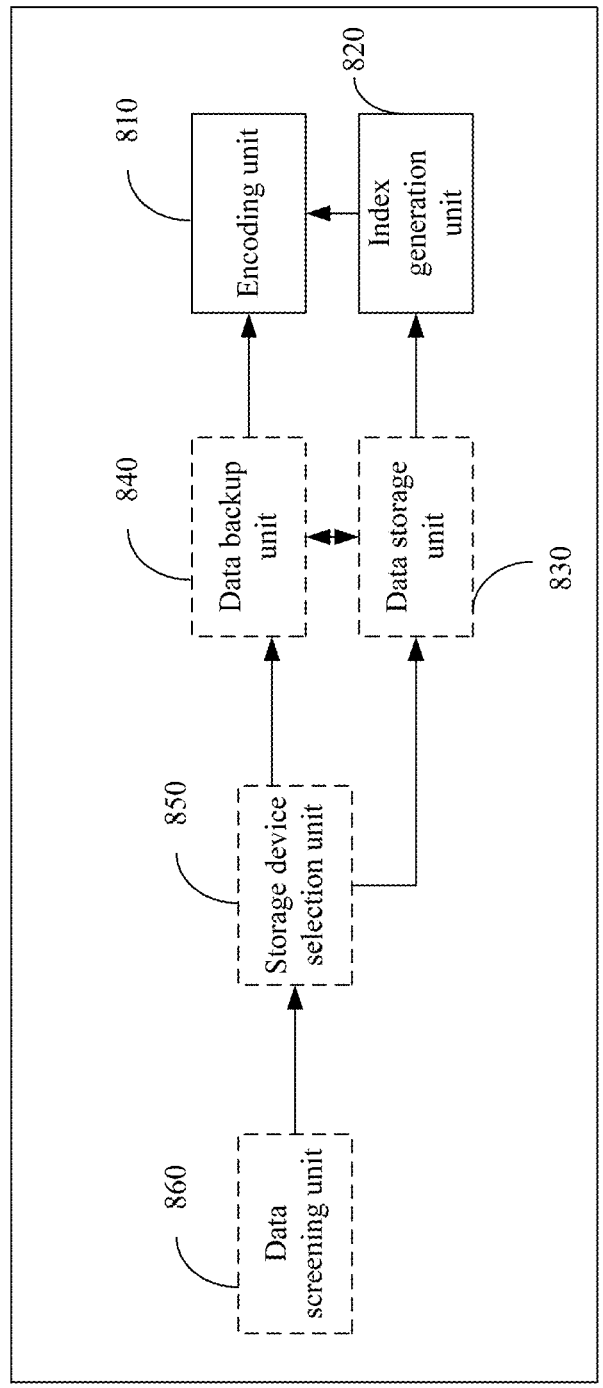
FIG. 8 is a schematic block diagram of a data management apparatus according to an embodiment of the present invention.
Figure 9:
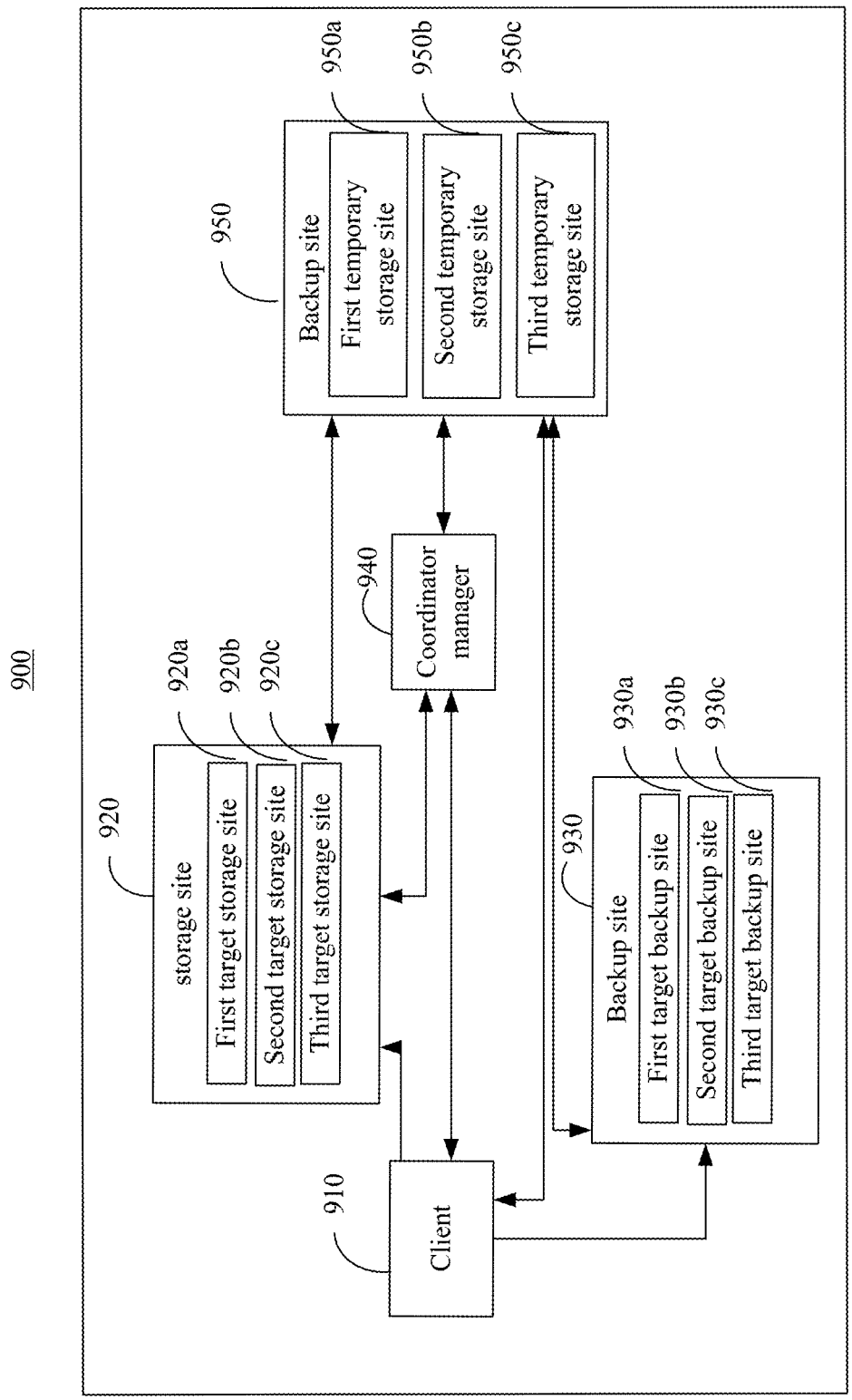
FIG. 9 is a schematic block diagram of a data management apparatus according to another embodiment of the present invention.
Figure 10:
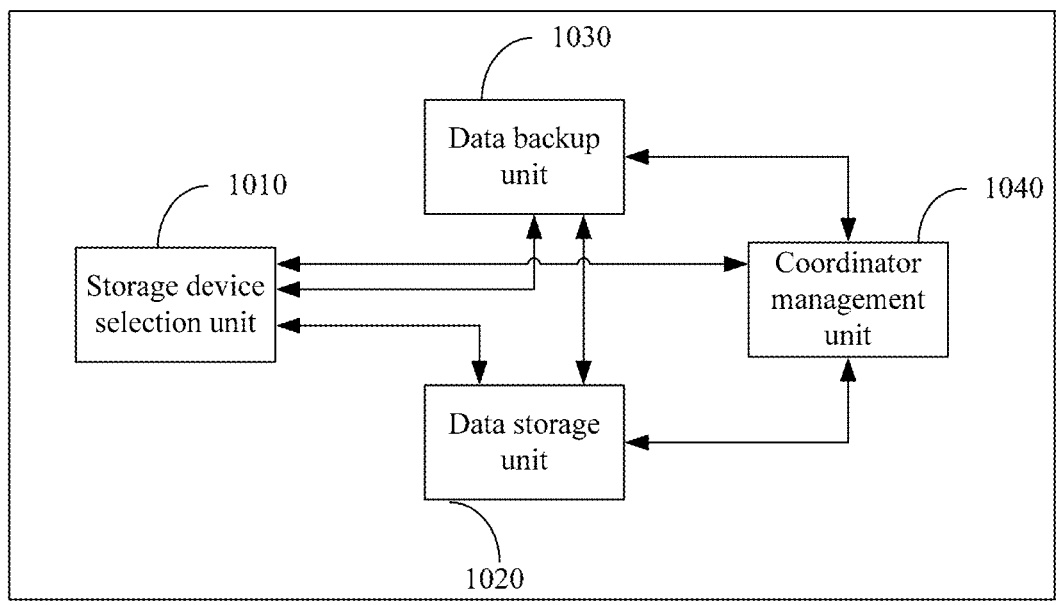
FIG. 10 is a schematic block diagram of a data management apparatus according to another embodiment of the present invention.

Various data management methods provided in the foregoing embodiments of the present invention may be implemented by using an apparatus. The apparatus may be understood as a functional unit that is divided based on a function and that is configured to implement a method step. The functional unit may independently implement one or more steps of the foregoing methods. When being implemented by hardware, the functional unit may be a specific circuit, a part of a circuit, different components in the system that each provide some capabilities, or a formed multi-component functional unit, to implement the foregoing methods. With reference to FIG. 8 to FIG. 10, the following describes, in an embodiment manner by using an example, a possible implementation of an apparatus or a system that implements the foregoing methods.

FIG. 8 is a schematic block diagram of a data management apparatus according to an embodiment of the present invention. The data management apparatus 800 includes:

an encoding unit 810, configured to encode a data chunk of a predetermined size, to generate an error-correcting data chunk corresponding to the data chunk, where the data chunk includes a data object, and the data object includes a key, a value, and metadata; and an index generation unit 820, configured to generate a data chunk index and a data object index, where the data chunk index is used to retrieve the data chunk and the error-correcting data chunk corresponding to the data chunk, the data object index is used to retrieve the data object in the data chunk, and each data object index is used to retrieve a unique data object.

The data processing apparatus can gather a plurality of data objects in one data chunk for encoding in a centralized manner. In this way, data encoding and backup can be effectively used to advantage. In other words, data redundancy is relatively low. This avoids disadvantages of low efficiency and high system redundancy that are caused by independent encoding and backing up of each data object.

Optionally, in an embodiment, the data management apparatus 800 further includes:

a data storage unit 830, configured to store the data object in the data chunk of the predetermined size, where the data chunk of the predetermined size is located in a first storage device; and a data backup unit 840, configured to store the error-correcting data in a second storage device, where the first storage device and the second storage device are located at different locations in a distributed storage system.

The data processing apparatus can store the data chunk and the corresponding error-correcting data chunk at different storage locations in the distributed storage system, for example, the first storage device and the second storage device. This can ensure that when some parts of the first storage device become faulty, data in the faulty storage device can be restored based on data in the second storage device and other parts of the first storage device that operate normally. Therefore, the distributed storage system can have a redundancy capability that meets a basic requirement, namely, reliability. The first storage device may be understood as a conventional data server configured to store the data chunk, and the second storage device may be understood as a parity server that stores the error-correcting data chunk of the data chunk. When a maximum of M servers (M data servers, M parity servers, or M servers including data servers and parity servers) in K data servers and M parity servers become faulty, remaining K servers may restore data in the faulty servers by using an encoding algorithm. The encoding algorithm may be EC encoding, XOR encoding, or another encoding algorithm that can implement data encoding and backup.

Optionally, in an embodiment, in the data management apparatus 800, the data chunk index includes a stripe list ID, a stripe ID, and location information; the stripe list ID is used to uniquely determine one of a plurality of storage device groups in the distributed storage system, and the storage device group includes a plurality of first devices and a plurality of second devices; the stripe ID is used to determine a sequence number of an operation of storing the data chunk and the error-correcting data chunk corresponding to the data chunk in the storage device group indicated by the stripe list ID; and the location information is used to determine a first storage device that is in the storage device group determined based on the stripe list ID and in which the data chunk is located, and a second storage device that is in the storage device group determined based on the stripe list ID and in which the error-correcting data chunk is located.

To restore a storage device after the storage device becomes faulty, in the present invention, a manner of a three-level index, that is, a stripe list ID, a stripe ID, and location information, is used to retrieve a data chunk. When a client needs to access a data chunk, the client may reconstruct a correct data chunk based on the index in combination with a key of a data object index, and all requests in a faulty period may be processed by another storage device determined based on the stripe ID. After the faulty storage device is restored, data is migrated to the restored storage device in a unified manner. This effectively ensures reliability of a distributed storage device using the data management method.

Optionally, in an embodiment, in the data management apparatus 800, the index generation unit 820 is configured to: generate the data chunk index and the data object index in the first storage device, and generate the data chunk index and the data object index in the second storage device.

Optionally, in an embodiment, the data management apparatus 800 further includes:

a storage device selection unit 850, configured to: select one first storage device and one or more second storage devices, and separately send the data object to the first storage device and the second storage device.

Optionally, in an embodiment, in the data management apparatus 800, the data storage unit 830 is configured to: store the data object in the data chunk; and when a size of the data object in the data chunk approximates or equals a storage limit of the data chunk, stop writing a new data object into the data chunk, and send, to the encoding unit, key values of all data objects stored in the data chunk; and the encoding unit 810 is configured to: receive the key values, sent by the data storage unit, of all the data objects in the data chunk, reconstruct the data chunk in the second storage device based on the key values of the data objects, and encode the reconstructed data chunk.

Optionally, in an embodiment, the data management apparatus 800 further includes a data screening unit 860, configured to: determine whether a size of a to-be-stored data object is less than a threshold, and use the to-be-stored data object whose size is less than the threshold as a data object that can be stored in the data chunk for storage and encoding.

Optionally, in an embodiment, in the data management apparatus 800, the data screening unit 860 is further configured to dynamically adjust the threshold at a predetermined time interval based on an average size of the to-be-stored data object.

Optionally, in an embodiment, in the data management apparatus 800, the distributed storage system includes a plurality of candidate storage devices, and the storage device selection unit 850 is configured to use one or more candidate storage devices with minimum load as the one or more second storage devices based on load statuses of the plurality of candidate storage devices.

Optionally, in an embodiment, in the data management apparatus 800, the data storage unit 830 is configured to: when a size of the data object is greater than a size of storage space in the data chunk, or when the size of the data object is greater than a size of remaining storage space in the data chunk, segment the data object, store, in the data chunk, a segmented data object whose size after the segmentation is less than the size of the storage space in the data chunk or less than the size of the remaining storage space in the data chunk, and store data chunk segmentation information in metadata of the segmented data object, to recombine the segmented data object.

FIG. 9 is a schematic block diagram of a data management system according to the present invention. The data management system 900 includes:

a client 910, further configured to: select one storage site 920 and a plurality of backup sites 930 for a to-be-stored data object, where the storage site and the plurality of backup sites have a same stripe list ID, and send the to-be-stored data object to the storage site and the plurality of backup sites, where the data object includes metadata, a key, and a value;

the storage site 920, configured to: store the to-be-stored data object in a data chunk that has a constant size and that is not encapsulated, add data index information of the to-be-stored data object to a data index, where the data index includes data index information of all data objects in the data chunk, and generate a data chunk index; and the backup site 930, configured to store the to-be-stored data object in a temporary buffer.

The storage site 920 is further configured to: after the to-be-stored data object is stored in the data chunk, if a total data size of all the data objects stored in the data chunk approximates a storage limit of the data chunk, encapsulate the data chunk, send a key list of all the data objects stored in the encapsulated data chunk to the backup site, and generate a same stripe ID for the storage site and the backup site.

The backup site 930 is further configured to: receive the key list sent by the storage site, retrieve, from the temporary buffer based on a key in the key list, a data object corresponding to the key, reconstruct, based on the data object, a data chunk corresponding to the key list, encode the reconstructed data chunk, to obtain a backup data chunk, and update the data chunk index and the data object index that is stored in the backup site and that corresponds to the encapsulated data chunk.

The data management apparatus allows storing a small data object in a data chunk of a constant size. Therefore, encoding and backup can be used to advantage, a data redundancy rate is reduced, and resources are reduced.

Optionally, in an embodiment, the client 910 is further configured to: search for, based on a key of a first target data object, the first target data object, a first target data chunk in which the first target data object is located, and a first target storage site 920*a* in which the first target data chunk is located, and send an updated value of the first target data object to the first target storage site 920*a*;

the first target storage site 920*a* is configured to: update a value of the first target data object, and send a difference value between the updated value of the first target data object and an original value of the first target data object to all first target backup sites 930*a* that have a stripe ID the same as that of the first target storage site; and if the first target data chunk is not encapsulated, the plurality of first target backup sites 930*a* are configured to: find, based on the key, the first target data object stored in buffers, and add the difference value and the original value of the first target data object, to obtain the updated value of the first target data object; or if the first target data chunk is already encapsulated, the plurality of first target backup sites 930*a* are configured to update, based on the difference value, first target backup data chunks corresponding to the first target data chunk.

Optionally, in an embodiment, the client 910 is further configured to: search for, based on the key of the first target data object, the first target data object, the first target data chunk in which the first target data object is located, and the first target storage site 920*a* in which the first target data chunk is located, and send, to the first target storage site 920*a*, a delete request for deleting the first target data object; and if the first target data chunk is not encapsulated, the first target storage site 920*a* is configured to: delete the first target data object, and send a delete instruction to the first target backup site 930*a*; and the first target backup site 930*a* is configured to delete, according to the delete instruction, the first target data object stored in the buffer; or if the first target data chunk is already encapsulated, the first target storage site 920*a* is configured to: set the value of the first target data object to a special value, and send a difference value between the special value and the original value of the first target data object to the plurality of first target backup sites 930*a*; and the plurality of first target backup sites 930*a* are configured to update the first target backup data chunk based on the difference value.

Optionally, in an embodiment, the client 910 is further configured to: select one second target storage site 920*b* and a plurality of second target backup sites 930*b* for a second target data object, where the second target storage site 920*b* and the plurality of second target backup sites have a same stripe list ID; send the second target data object to the second target storage site 920*b*; and when the second target storage site is a faulty storage site, send the second target data object to the coordinator manager 940;

the coordinator manager 940 is configured to: obtain a stripe list ID corresponding to the second target data object, determine a normal storage site that has a stripe list ID the same as the stripe list ID as a first temporary storage site 950*a*, and instruct the client to send the second target data object to the first temporary storage site 950*a* for storage; and the first temporary storage site 950*a* is configured to: store the second target data object, and after a fault of the second target storage site is cleared, migrate the second target data object to the second target storage site 920*b* whose fault is cleared.

Optionally, in an embodiment, the client 910 is further configured to: send, to the second target storage site 920*b*, a data obtaining request for requesting the second target data object, and when the second target storage site 920*b* is the faulty storage site, send the data obtaining request to the coordinator manager 940;

the coordinator manager 940 is configured to: obtain the stripe list ID corresponding to the second target data object, determine a normal storage site that has a stripe list ID the same as the stripe list ID as a second temporary storage site 950*b*, and instruct the client to send the data obtaining request to the second temporary storage site 950*b*; and the second temporary storage site 950*b* is configured to return the corresponding second target data object according to the data obtaining request.

Optionally, in an embodiment, the second temporary storage site 950*b* is further configured to:

if a second data chunk in which the second target data object is located is not encapsulated, send a data request to the second target backup site 930*b* corresponding to the second target storage site, where the second target backup site is configured to: obtain the corresponding second target data object from a buffer according to the data request, and return the second target data object to the second temporary storage site, and the second temporary storage site is configured to return the requested second target data object to the client 910; and if the second target data object requested by the data request is newly added or modified after the second target storage site becomes faulty, return the corresponding second target data object to the client; or otherwise, obtain, based on a stripe ID corresponding to the second target data object, a second backup data chunk that is from a second target backup site having a stripe ID the same as the stripe ID corresponding to the second target data object and that corresponds to the second target data object, restore, based on the second backup data chunk, a second target data chunk including the second target data object, obtain the second target data object from the second target data chunk, and return the second target data object to the client.

Optionally, in an embodiment, the client 910 is further configured to: send, to a third target storage site 920*c*, a data modification request for modifying a third target data object, and when the third target storage site is a faulty storage site, send the data modification request to the coordinator manager 940;

the coordinator manager 940 is configured to: obtain a stripe list ID corresponding to the third target data object, determine a normal storage site that has a stripe list ID the same as the stripe list ID as a third temporary storage site 950*c*, and instruct the client to send the data modification request to the third temporary storage site 950*c*; and the third temporary storage site 950*c* is configured to modify the third target data object according to the data modification request.

Optionally, in an embodiment, the third temporary storage site 950*c* is further configured to: store the data modification request, obtain, based on a stripe ID corresponding to the third target data object, a third backup data chunk that is from a third target backup site 930*c* having a stripe ID the same as the stripe ID corresponding to the third target data object and that corresponds to the third target data object, restore, based on the third backup data chunk, a third target data chunk including the third target data object, and send a difference value between an updated value carried in the data modification request and an original value of the third target data object to the third target backup site 930*c*;

the third target backup site 930*c* is configured to update the third backup data chunk based on the difference value;

after a fault of the third target storage site is cleared, the third temporary storage site 950*c* is configured to migrate the stored data modification request to the third target storage site 920*c*; and the third target storage site is configured to modify, according to the data modification request, the third target data object stored in the third target storage site.

FIG. 10 is a schematic block diagram of a data management apparatus according to an embodiment of the present invention. The data management apparatus 1000 includes:

a storage device selection unit 1010, configured to: select one storage site and a plurality of backup sites for a to-be-stored data object, where the storage site and the plurality of backup sites have a same stripe list ID, and send the to-be-stored data object to the data storage unit and a data backup unit, where the data object includes metadata, a key, and a value;

the data storage unit 1020, configured to: store the to-be-stored data object in a data chunk that has a constant size in the storage site and that is not encapsulated, add data index information of the to-be-stored data object to a data index, where the data index includes data index information of all data objects in the data chunk, and generate a data chunk index; and the data backup unit 1030, configured to store the to-be-stored data object in a temporary buffer of the backup site.

After the to-be-stored data object is stored in the data chunk, if a total data size of all the data objects stored in the data chunk approximates a storage limit of the data chunk, the data storage unit is configured to: encapsulate the data chunk, send a key list of all the data objects stored in the encapsulated data chunk to the data backup unit, and generate a same stripe ID for the storage site and the backup site.

The data backup unit is configured to: retrieve, from a temporary buffer of the storage site based on a key in the key list, a data object corresponding to the key, reconstruct, based on the data object, a data chunk corresponding to the key list, encode the reconstructed data chunk, to obtain a backup data chunk, and update the data chunk index and the data object index that is stored in the backup site and that corresponds to the encapsulated data chunk.

The data processing apparatus can gather a plurality of data objects in one data chunk for encoding in a centralized manner. In this way, data encoding and backup can be effectively used to advantage. In other words, data redundancy is relatively low. This avoids disadvantages of low efficiency and high system redundancy that are caused by independent encoding and backing up of each data object.

Optionally, in an embodiment, in the data processing apparatus 1000, the storage device selection unit 1010 is further configured to: search for, based on a key of a first target data object, the first target data object, a first target data chunk in which the first target data object is located, and a first target storage site in which the first target data chunk is located, and send an updated value of the first target data object to the data storage unit 1020;

the data storage unit 1020 is configured to: update a value of the first target data object in the first target storage site based on the updated value, and send a difference value between the updated value of the first target data object and an original value of the first target data object to the data backup unit; and the data backup unit 1030 is configured to update first target backup data that is in all first target backup sites having a stripe ID the same as that of the first target storage site and that corresponds to the first target data object; and if the first target data chunk is not encapsulated, the data backup unit is configured to: find, based on the key, the first target data object stored in a buffer of the first target backup site, use the first target data object as the first target backup data, and add the difference value and an original value of the first target backup data, to obtain the updated value of the first target data object; or if the first target data chunk is already encapsulated, the data backup unit is configured to update, based on the difference value, first target backup data chunks in the plurality of first target backup sites, where the first target backup data chunks correspond to the first target data chunk.

Optionally, in an embodiment, in the data processing apparatus 1000, the storage device selection unit 1010 is further configured to: search for, based on the key of the first target data object, the first target data object, the first target data chunk in which the first target data object is located, and the first target storage site in which the first target data chunk is located, and send, to the data storage unit, a delete request for deleting the first target data object; and if the first target data chunk is not encapsulated, the data storage unit 1020 is configured to: delete the first target data object in the first target storage site, and send a delete instruction to the data backup unit; and the data backup unit is configured to delete, according to the delete instruction, the first target data object stored in the buffer of the first target backup site; or if the first target data chunk is already encapsulated, the data storage unit 1020 is configured to: set the value of the first target data object in the first target storage site to a special value, and send a difference value between the special value and the original value of the first target data object to the data backup unit; and the data backup unit is configured to update the first target backup data chunks in the plurality of first target backup sites based on the difference value, where the first target backup data chunks correspond to the first target data chunk.

Optionally, in an embodiment, in the data processing apparatus 1000, the storage device selection unit 1010 is further configured to: select one second target storage site and a plurality of second target backup sites for a second target data object, where the second target storage site and the plurality of second target backup sites have a same stripe list ID; send the second target data object to the second target storage site; and when the second target storage site is a faulty storage site, send the second target data object to a coordinator management unit 1040;

the coordinator management unit 1040 is configured to: obtain a stripe list ID corresponding to the second target data object, determine a normal storage site that has a stripe list ID the same as the stripe list ID as a first temporary storage site, and instruct the storage device selection unit to send the second target data object to the data storage unit;

the data storage unit 1020 is configured to store the second target data object in the first temporary storage site; and after a fault of the second target storage site is cleared, the data storage unit 1020 is configured to migrate the second target data object stored in the first temporary storage site to the second target storage site whose fault is cleared.

Optionally, in an embodiment, in the data processing apparatus 1000, the storage device selection unit 1010 is further configured to send, to the data storage unit, a data obtaining request for requesting the second target data object;

when determining that the second target storage site that stores the second target data object is the faulty storage site, the data storage unit 1020 is configured to instruct the storage device selection unit to send the data obtaining request to the coordinator manager unit;

the coordinator management unit 1040 is configured to: obtain, according to the data obtaining request, the stripe list ID corresponding to the second target data object, and determine a normal storage site that has a stripe list ID the same as the stripe list ID as a second temporary storage site; and the data storage unit 1010 is configured to: obtain the second target data object from the second temporary storage site according to the data obtaining request, and return the second target data object to the storage device selection unit.

Optionally, in an embodiment, in the data processing apparatus 1000, if a second data chunk in which the second target data object is located is not encapsulated, the data storage unit 1020 is configured to send the data request to the data backup unit;

the data backup unit 1030 is configured to: obtain, according to the data request, the corresponding second target data object from buffers of the plurality of second target backup sites corresponding to the second target storage site, and return the second target data object to the data storage unit 1020; and the data storage unit 1020 is configured to return the requested second target data object to the storage device selection unit 1010; and if the second target data object requested by the data request is newly added or modified after the second target storage site becomes faulty, the data storage unit 1020 is configured to: obtain the corresponding second target data object value from the second temporary storage site, and return the corresponding second target data object value to the storage device selection unit; or otherwise, the data storage unit 1020 is configured to: obtain, based on a stripe ID corresponding to the second target data object, a second backup data chunk that is from a second target backup site having a stripe ID the same as the stripe ID corresponding to the second target data object and that corresponds to the second target data object, restore, based on the second backup data chunk, a second target data chunk including the second target data object, obtain the second target data object from the second target data chunk, and return the second target data object to the storage device selection unit 1010.

Optionally, in an embodiment, in the data processing apparatus 1000, the storage device selection unit 1010 is further configured to send, to the data storage unit, a data modification request for modifying a third target data object;

when determining that a third target storage site that stores the third target data object is a faulty storage site, the data storage unit 1020 is configured to instruct the storage device selection unit to send the data modification request to the coordinator management unit;

the coordinator management unit 1040 is configured to: obtain, according to the data obtaining request, a stripe list ID corresponding to the third target data object, and determine a normal storage site that has a stripe list ID the same as the stripe list ID as a third temporary storage site; and the data storage unit 1020 is configured to modify, according to the data modification request, the third target data object stored in the third temporary storage site.

Optionally, in an embodiment, in the data processing apparatus 1000, the data storage unit 1020 is further configured to: store the data modification request in the third temporary storage site, obtain, based on a stripe ID corresponding to the third target data object, a third backup data chunk that is from a third target backup site having a stripe ID the same as the stripe ID corresponding to the third target data object and that corresponds to the third target data object, restore, based on the third backup data chunk, a third target data chunk including the third target data object, and send a difference value between an updated value carried in the data modification request and an original value of the third target data object to the data backup unit 1030;

the data backup unit 1030 is configured to update the third backup data chunk based on the difference value; and after a fault of the third target storage site is cleared, the data storage unit 1020 is configured to modify, according to the data modification request stored in the third temporary storage site, the third target data object stored in the third target storage site. In one or more instances, the described functions may be implemented by hardware, software, firmware, or any combination thereof. If the functions are implemented by software, the functions may be used as one or more instructions or code to be stored in a computer readable medium or to be sent by using a computer readable medium, and to be executed by using a hardware-based processing unit. The computer readable medium may include a computer readable storage medium (which corresponds to a tangible medium such as a data storage medium) or a communications medium. The communications medium includes (for example) any medium that promotes, based on a communications protocol, a computer program to be transmitted from one place to another place. In this manner, the computer readable medium may generally correspond to: (1) a non-transitory tangible computer readable storage medium, or (2) a communications medium such as a signal or a carrier. The data storage medium may be any available medium that can be accessed by one or more computers or one or more processors, to retrieve an instruction, code, and/or a data structure, so as to implement the technologies described in the present invention. A computer program product may include the computer readable medium.

By way of example and not limitation, some computer readable storage media may include a RAM, a ROM, an EEPROM, a CD-ROM, another optical disc storage or magnetic disk storage, another magnetic storage apparatus, a flash memory, or any other medium that can store required program code in a form of an instruction or a data structure and that can be accessed by a computer. In addition, any connection may be appropriately referred to as a computer readable medium. For example, if an instruction is sent from a website, a server, or another remote source by using a coaxial cable, an optical cable, a twisted pair, a digital subscriber line (DSL), or a wireless technology (for example, infrared, radio, or microwave), the coaxial cable, the optical cable, the twisted pair, the DSL, or the wireless technology (for example, infrared, radio, or microwave) is included in a definition of a medium. However, it should be understood that the computer readable storage medium and the data storage medium may not include a connection, a carrier, a signal, or another transitory medium, but are non-transitory tangible storage media. A disk and an optical disc used in this specification include a compact disc (CD), a laser disc, an optical disc, a digital versatile disc (DVD), a floppy disk, and a Blu-ray disc, where the disk generally magnetically copies data, and the optical disc optically copies data by using a laser. A combination of the foregoing objects shall further be included in the scope of the computer readable medium.

An instruction may be executed by one or more processors such as one or more digital signal processors (DSP), a general-purpose microprocessor, an application-specific integrated circuit (ASIC), a field programmable gate array (FPGA), or another equivalent integrated circuit or discrete logic circuit. Therefore, the term "processor" used in this specification may refer to the foregoing structure, or any other structure that may be applied to implementation of the technologies described in this specification. In addition, in some aspects, the functions described in this specification may be provided in a dedicated hardware and/or software module configured for encoding and decoding, or may be incorporated into a combined coder-decoder. In addition, the technologies may be completely implemented in one or more circuits or logic elements.

The technologies in the present invention may be widely implemented by a plurality of apparatuses or devices. The apparatuses or devices include a radio handset, an integrated circuit (IC), or an IC set (for example, a chip set). In the present invention, various components, modules, and units are described to emphasize functions of an apparatus that is configured to implement the disclosed technologies, and the functions do not necessarily need to be implemented by different hardware units. Precisely, as described in the foregoing, various units may be combined into a coder-decoder hardware unit, or may be provided by a set of interoperable hardware units (including one or more processors described in the foregoing) and appropriate software and/or firmware.

It should be understood that "an implementation" or "one implementation" mentioned in the whole specification means that particular features, structures, or characteristics related to the implementation are included in at least one implementation of the present invention. Therefore, "in an implementation" or "in one implementation" appearing throughout the specification is not necessarily a same implementation. In addition, these particular features, structures, or characteristics may be combined in one or more implementations in any appropriate manner.

It should be understood that sequence numbers of the foregoing processes do not indicate execution sequences in various implementations of the present invention. The execution sequences of the processes should be determined based on functions and internal logic of the processes, and should not be construed as any limitation on the implementation processes of the implementations of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the implementations provided in this application, "B corresponding to A" indicates that B is associated with A, and B may be determined based on A. However, it should be further understood that determining B based on A does not mean that B is determined based only on A; to be specific, B may also be determined based on A and/or other information.

A person of ordinary skill in the art may be aware that, in combination with the examples described in the implementations disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data management method, comprising:
   encoding a data chunk of a predetermined size, to generate an error-correcting data chunk corresponding to the data chunk, wherein the data chunk of the predetermined size is stored in a first storage device, the data chunk comprises a data object, and the data object comprises a key, a value, and metadata; and
   generating a data chunk index and a data object index, wherein the data chunk index is used to retrieve the data chunk and the error-correcting data chunk corresponding to the data chunk, the data object index is used to retrieve the data object in the data chunk, each data object index is used to retrieve a unique data object, the error-correcting data chunk is stored in a second storage device, the first storage device and the second storage device are located at different locations in a distributed storage system.

2. The data management method according to claim 1, wherein the data chunk index comprises a stripe list ID, a stripe ID, and location information;
   the stripe list ID is used to uniquely determine one of a plurality of storage device groups in the distributed storage system, and the storage device group comprises a plurality of first devices and a plurality of second devices;
   the stripe ID is used to determine a sequence number of an operation of storing the data chunk and the error-correcting data chunk corresponding to the data chunk in the storage device group indicated by the stripe list ID; and
   the location information is used to determine the first storage device that is in the storage device group determined based on the stripe list ID and in which the data chunk is located, and the second storage device that is in the storage device group determined based on the stripe list ID and in which the error-correcting data chunk is located.

3. The data management method according to claim 2, wherein the generating the data chunk index and the data object index comprises:
   generating the data chunk index and the data object index in the first storage device; and
   generating the data chunk index and the data object index in the second storage device.

4. The data management method according to claim 1, wherein the method further comprises:
   when a size of the data object in the data chunk approximates or equals a storage limit of the data chunk, stops writing a new data object into the data chunk, and sending, to the second storage device, key values of data objects stored in the data chunk; and wherein
   the second storage device receives the key values, sent by the first storage device, of the data objects in the data chunk, the second storage device reconstructs the data chunk in the second storage device based on the key values of the data objects, and the second storage device encodes the reconstructed data chunk.

5. The data management method according to claim 1, wherein the method further comprises:
   when the data chunk comprises a plurality of data objects:
      determining whether a size of a to-be-stored data object is less than a threshold; and
      storing and encoding the to-be-stored data object whose size is less than the threshold.

6. A data management method, comprising:
   selecting one storage site and a plurality of backup sites for a to-be-stored data object, wherein the storage site and the plurality of backup sites have a same stripe list ID;

sending the to-be-stored data object to the storage site and the plurality of backup sites, wherein the data object comprises metadata, a key, and a value;

in the storage site, storing the to-be-stored data object in a data chunk that has a constant size and that is not encapsulated, adding data index information of the to-be-stored data object to a data index, wherein the data index comprises data index information of data objects in the data chunk, and generating a data chunk index;

in the backup site, storing the to-be-stored data object in a temporary buffer;

after the to-be-stored data object is stored in the data chunk, if a total data size of the data objects stored in the data chunk approximates a storage limit of the data chunk, encapsulating the data chunk, sending a key list of the data objects stored in the encapsulated data chunk to the backup site, and generating a same stripe ID for the storage site and the backup site; and after receiving the key list, retrieving, by the backup site from the temporary buffer based on a key in the key list, a data object corresponding to the key, reconstructing, based on the data object, a data chunk corresponding to the key list, encoding the reconstructed data chunk, to obtain a backup data chunk, storing the backup data chunk in the backup site, and updating the data chunk index and the data object index that is stored in the backup site and that corresponds to the encapsulated data chunk.

7. The data management method according to claim 6, further comprising:

searching for, based on a key of a first target data object, the first target data object, a first target data chunk in which the first target data object is located, and a first target storage site in which the first target data chunk is located;

sending an updated value of the first target data object to the first target storage site;

updating a value of the first target data object in the first target storage site based on the updated value, and sending a difference value between the updated value of the first target data object and an original value of the first target data object to first target backup sites that have a stripe ID the same as that of the first target storage site; and if the first target data chunk is not encapsulated, finding, based on the key, the first target data object stored in a buffer of the first target backup site, and adding the difference value and the original value of the first target data object, to obtain the updated value of the first target data object; or if the first target data chunk is already encapsulated, updating, based on the difference value, first target backup data chunks that are in the plurality of first target backup sites and that correspond to the first target data chunk.

8. The data management method according to claim 6, further comprising:

searching for, based on the key of the first target data object, the first target data object, the first target data chunk in which the first target data object is located, and the first target storage site in which the first target data chunk is located;

sending, to the first target storage site, a delete request for deleting the first target data object; and if the first target data chunk is not encapsulated, deleting the first target data object in the first target storage site, and sending a delete instruction to the first target backup site, to delete the first target data object stored in the buffer of the first target backup site; or if the first target data chunk is already encapsulated, setting the value of the first target data object in the first target storage site to a special value, and sending a difference value between the special value and the original value of the first target data object to the plurality of first target backup sites, wherein the first target backup data chunks in the plurality of first target backup sites are updated based on the difference value, and the first target backup data chunks correspond to the first target data chunk.

9. The data management method according to claim 6, further comprising:

selecting one second target storage site and a plurality of second target backup sites for a second target data object, wherein the second target storage site and the plurality of second target backup sites have a same stripe list ID;

sending the second target data object to the second target storage site; and when the second target storage site is a faulty storage site, sending the second target data object to a coordinator manager, wherein the coordinator manager obtains a stripe list ID corresponding to the second target data object, the coordinator manager determines a normal storage site that has a stripe list ID the same as the stripe list ID as a first temporary storage site, and the coordinator manager instructs to send the second target data object to the first temporary storage site for storage;

storing the second target data object in the first temporary storage site; and after a fault of the second target storage site is cleared, migrating the second target data object stored in the first temporary storage site to the second target storage site whose fault is cleared.

10. The data management method according to claim 6, further comprising:

sending, to the second target storage site, a data obtaining request for requesting the second target data object; and when the second target storage site is the faulty storage site, sending the data obtaining request to the coordinator manager, wherein the coordinator manager obtains, according to the data obtaining request, the stripe list ID corresponding to the second target data object, the coordinator manager determines a normal storage site that has a stripe list ID the same as the stripe list ID as a second temporary storage site, the coordinator manager instructs to send the data obtaining request to the second temporary storage site, and the second temporary storage site returns the corresponding second target data object according to the data obtaining request.

11. The data management method according to claim 10, wherein the second temporary storage site returns the corresponding second target data object according to the data obtaining request comprises:

if a second data chunk in which the second target data object is located is not encapsulated, sending, by the second temporary storage site, a data request to the second target backup site corresponding to the second target storage site; obtaining, by the second target backup site, the corresponding second target data object from a buffer of the second target backup site according to the data request, and returning the second target data object to the second temporary storage site;

and returning, by the second temporary storage site, the requested second target data object; or if the second target data object requested by the data request is newly added or modified after the second target storage site becomes faulty, obtaining the corresponding second target data object from the second temporary storage site, and returning the corresponding second target data object; or otherwise, obtaining, by the second temporary storage site based on a stripe ID corresponding to the second target data object, a second backup data chunk that is from a second target backup site having a stripe ID the same as the stripe ID corresponding to the second target data object and that corresponds to the second target data object, restoring, based on the second backup data chunk, a second target data chunk comprising the second target data object, and obtaining the second target data object from the second target data chunk, and returning the second target data object.

12. A data management apparatus, comprising:
a non-transitory memory storage comprising instructions; and
one or more hardware processors in communication with the non-transitory memory storage, wherein the one or more hardware processors execute the instructions to:
encode a data chunk of a predetermined size, to generate an error-correcting data chunk corresponding to the data chunk, wherein the data chunk of the predetermined size is stored in a first storage device, the data chunk comprises a data object, and the data object comprises a key, a value, and metadata; and
generate a data chunk index and a data object index, wherein the data chunk index is used to retrieve the data chunk and the error-correcting data chunk corresponding to the data chunk, the data object index is used to retrieve the data object in the data chunk, each data object index is used to retrieve a unique data object, the error-correcting data chunk is stored in a second storage device, the first storage device and the second storage device are located at different locations in a distributed storage system.

13. The data management apparatus according to claim 12, wherein the data chunk index comprises a stripe list ID, a stripe ID, and location information;
the stripe list ID is used to uniquely determine one of a plurality of storage device groups in the distributed storage system, and the storage device group comprises a plurality of first devices and a plurality of second devices;
the stripe ID is used to determine a sequence number of an operation of storing the data chunk and the error-correcting data chunk corresponding to the data chunk in the storage device group indicated by the stripe list ID; and
the location information is used to determine a first storage device that is in the storage device group determined based on the stripe list ID and in which the data chunk is located, and a second storage device that is in the storage device group determined based on the stripe list ID and in which the error-correcting data chunk is located.

14. The data management apparatus according to claim 13, wherein the one or more hardware processors execute the instructions to:
generate the data chunk index and the data object index in the first storage device; and
generate the data chunk index and the data object index in the second storage device.

15. The data management apparatus according to claim 13, wherein the one or more hardware processors execute the instructions to:
store the data object in the data chunk;
when a size of the data object in the data chunk approximates or equals a storage limit of the data chunk, stop writing a new data object into the data chunk, and send key values of data objects stored in the data chunk;
receive the key values of the data objects in the data chunk;
reconstruct the data chunk in the second storage device based on the key values of the data objects; and
encode the reconstructed data chunk.

16. A data management system, comprising:
a client, configured to: select one storage site and a plurality of backup sites for a to-be-stored data object, wherein the storage site and the plurality of backup sites have a same stripe list ID, and send the to-be-stored data object to the storage site and the plurality of backup sites, wherein the data object comprises metadata, a key, and a value;
the storage site, configured to: store the to-be-stored data object in a data chunk that has a constant size and that is not encapsulated, add data index information of the to-be-stored data object to a data index, wherein the data index comprises data index information of data objects in the data chunk, and generate a data chunk index; and
the backup site, configured to store the to-be-stored data object in a temporary buffer, wherein
after the to-be-stored data object is stored in the data chunk, if a total data size of the data objects stored in the data chunk approximates a storage limit of the data chunk, the storage site is configured to: encapsulate the data chunk, send a key list of the data objects stored in the encapsulated data chunk to the backup site, and generate a same stripe ID for the storage site and the backup site; and
the backup site is further configured to: receive the key list sent by the storage site, retrieve, from the temporary buffer based on a key in the key list, a data object corresponding to the key, reconstruct, based on the data object, a data chunk corresponding to the key list, encode the reconstructed data chunk, to obtain a backup data chunk, store the backup data chunk in the backup site, and update the data chunk index and the data object index that is stored in the backup site and that corresponds to the encapsulated data chunk.

17. The data management system according to claim 16, wherein
the client is further configured to: search for, based on a key of a first target data object, the first target data object, a first target data chunk in which the first target data object is located, and a first target storage site in which the first target data chunk is located, and send an updated value of the first target data object to the first target storage site;
the first target storage site is configured to: update a value of the first target data object, and send a difference value between the updated value of the first target data object and an original value of the first target data object to first target backup sites that have a stripe ID the same as that of the first target storage site; and
if the first target data chunk is not encapsulated, the plurality of first target backup sites are configured to:

find, based on the key, the first target data object stored in buffers, and add the difference value and the original value of the first target data object, to obtain the updated value of the first target data object; or if the first target data chunk is already encapsulated, the plurality of first target backup sites are configured to update, based on the difference value, first target backup data chunks corresponding to the first target data chunk.

18. The data management system according to claim 16, wherein the client is further configured to: search for, based on the key of the first target data object, the first target data object, the first target data chunk in which the first target data object is located, and the first target storage site in which the first target data chunk is located, and send, to the first target storage site, a delete request for deleting the first target data object; and if the first target data chunk is not encapsulated, the first target storage site is configured to: delete the first target data object, and send a delete instruction to the first target backup site; and the first target backup site is configured to delete, according to the delete instruction, the first target data object stored in the buffer; or if the first target data chunk is already encapsulated, the first target storage site is configured to: set the value of the first target data object to a special value, and send a difference value between the special value and the original value of the first target data object to the plurality of first target backup sites; and the plurality of first target backup sites are configured to update the first target backup data chunk based on the difference value.

19. The data management system according to claim 16, wherein the client is further configured to: select one second target storage site and a plurality of second target backup sites for a second target data object, wherein the second target storage site and the plurality of second target backup sites have a same stripe list ID; send the second target data object to the second target storage site; and when the second target storage site is a faulty storage site, send the second target data object to a coordinator manager; wherein the coordinator manager is configured to: obtain a stripe list ID corresponding to the second target data object, determine a normal storage site that has a stripe list ID the same as the stripe list ID as a first temporary storage site, and instruct the client to send the second target data object to the first temporary storage site for storage; and the first temporary storage site is configured to: store the second target data object, and after a fault of the second target storage site is cleared, migrate the second target data object to the second target storage site whose fault is cleared.

20. The data management system according to claim 16, wherein the client is further configured to: send, to the second target storage site, a data obtaining request for requesting the second target data object, and when the second target storage site is the faulty storage site, send the data obtaining request to the coordinator manager;

the coordinator manager is configured to: obtain the stripe list ID corresponding to the second target data object, determine a normal storage site that has a stripe list ID the same as the stripe list ID as a second temporary storage site, and instruct the client to send the data obtaining request to the second temporary storage site; and the second temporary storage site is configured to return the corresponding second target data object according to the data obtaining request.

21. A data management apparatus, comprising:

a non-transitory memory storage comprising instructions; and one or more hardware processors in communication with the non-transitory memory storage, wherein the one or more hardware processors execute the instructions to:

select one storage site and a plurality of backup sites for a to-be-stored data object, wherein the storage site and the plurality of backup sites have a same stripe list ID, and send the to-be-stored data object, wherein the data object comprises metadata, a key, and a value;

store the to-be-stored data object in a data chunk that has a constant size in the storage site and that is not encapsulated, add data index information of the to-be-stored data object to a data index, wherein the data index comprises data index information of data objects in the data chunk, and generate a data chunk index;

store the to-be-stored data object in a temporary buffer of the backup site;

after the to-be-stored data object is stored in the data chunk, if a total data size of the data objects stored in the data chunk approximates a storage limit of the data chunk, encapsulate the data chunk, send a key list of the data objects stored in the encapsulated data chunk, and generate a same stripe ID for the storage site and the backup site; and retrieve, from a temporary buffer of the storage site based on a key in the key list, a data object corresponding to the key, reconstruct, based on the data object, a data chunk corresponding to the key list, encode the reconstructed data chunk, to obtain a backup data chunk, store the backup data chunk in the backup site, and update the data chunk index and the data object index that is stored in the backup site and that corresponds to the encapsulated data chunk.

22. The data management apparatus according to claim 21, wherein the one or more hardware processors execute the instructions to:

search for, based on a key of a first target data object, the first target data object, a first target data chunk in which the first target data object is located, and a first target storage site in which the first target data chunk is located, and send an updated value of the first target data object;

update a value of the first target data object in the first target storage site based on the updated value, and send a difference value between the updated value of the first target data object and an original value of the first target data object; and update first target backup data that is in first target backup sites having a stripe ID the same as that of the first target storage site and that corresponds to the first target data object; and if the first target data chunk is not encapsulated, find, based on the key, the first target data object stored in a buffer of the first target backup site, use the first target data object as the first target backup data, and add the difference value and an original value of the first target backup data, to obtain the updated value of the first target data object; or if the first target data chunk is already encapsulated, update, based on the difference value, first target backup data chunks in the plurality of first target backup sites, wherein the first target backup data chunks correspond to the first target data chunk.

23. The data management apparatus according to claim 21, wherein the one or more hardware processors execute the instructions to:
  search for, based on the key of the first target data object, the first target data object, the first target data chunk in which the first target data object is located, and the first target storage site in which the first target data chunk is located, and send a delete request for deleting the first target data object; and
  if the first target data chunk is not encapsulated, delete the first target data object in the first target storage site, and send a delete instruction; and delete, according to the delete instruction, the first target data object stored in the buffer of the first target backup site; or
  if the first target data chunk is already encapsulated, set the value of the first target data object in the first target storage site to a special value, and send a difference value between the special value and the original value of the first target data object; and update the first target backup data chunks in the plurality of first target backup sites based on the difference value, wherein the first target backup data chunks correspond to the first target data chunk.

24. The data management apparatus according to claim 21, wherein the one or more hardware processors execute the instructions to:
  select one second target storage site and a plurality of second target backup sites for a second target data object, wherein the second target storage site and the plurality of second target backup sites have a same stripe list ID; send the second target data object to the second target storage site; and when the second target storage site is a faulty storage site, send the second target data object to a coordinator manager; wherein
  the coordinator manager is configured to: obtain a stripe list ID corresponding to the second target data object, determine a normal storage site that has a stripe list ID the same as the stripe list ID as a first temporary storage site, and send the second target data object; and
  the one or more hardware processors execute the instructions to: store the second target data object in the first temporary storage site; and after a fault of the second target storage site is cleared, migrate the second target data object stored in the first temporary storage site to the second target storage site whose fault is cleared.

25. The data management apparatus according to claim 21, wherein the one or more hardware processors execute the instructions to:
  send a data obtaining request for requesting the second target data object;
  when determining that the second target storage site that stores the second target data object is the faulty storage site, send the data obtaining request to the coordinator manager; and wherein
  the coordinator manager is configured to: obtain, according to the data obtaining request, the stripe list ID corresponding to the second target data object, and determine a normal storage site that has a stripe list ID the same as the stripe list ID as a second temporary storage site; and
  the one or more hardware processors execute the instructions to: obtain the second target data object from the second temporary storage site according to the data obtaining request, and return the second target data object.

26. The data management apparatus according to claim 21, wherein the one or more hardware processors execute the instructions to:
  if a second data chunk in which the second target data object is located is not encapsulated, send a data request;
  obtain, according to the data request, the corresponding second target data object from buffers of the plurality of second target backup sites corresponding to the second target storage site, and return the second target data object; and return the requested second target data object; or
  if the second target data object requested by the data request is newly added or modified after the second target storage site becomes faulty, obtain the corresponding second target data object from the second temporary storage site, and return the corresponding second target data object; or
  otherwise, obtain, based on a stripe ID corresponding to the second target data object, a second backup data chunk that is from a second target backup site having a stripe ID the same as the stripe ID corresponding to the second target data object and that corresponds to the second target data object, restore, based on the second backup data chunk, a second target data chunk comprising the second target data object, obtain the second target data object from the second target data chunk, and return the second target data object.

* * * * *